US012110827B1

United States Patent
Rambo et al.

(10) Patent No.: US 12,110,827 B1
(45) Date of Patent: Oct. 8, 2024

(54) FUEL SYSTEMS FOR AIRCRAFT ENGINES

(71) Applicant: General Electric Company, Schenectady, NY (US)

(72) Inventors: Jeffrey D. Rambo, Evendale, OH (US); Scott G. Edens, Evendale, OH (US); Michael Joseph Murray, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/311,660

(22) Filed: May 3, 2023

(51) Int. Cl.
*F02C 7/236* (2006.01)
*F02C 7/32* (2006.01)

(52) U.S. Cl.
CPC .............. *F02C 7/236* (2013.01); *F02C 7/32* (2013.01); *F05D 2220/323* (2013.01); *F05D 2270/07* (2013.01)

(58) Field of Classification Search
CPC .. F02C 7/22; F02C 7/222; F02C 7/232; F02C 7/236; F02C 7/32; F02C 9/30; F02C 9/28
See application file for complete search history.

(56) References Cited

U.S. PATENT DOCUMENTS

| | | | |
|---|---|---|---|
| 3,017,922 A | 1/1962 | Peterson | |
| 3,894,813 A | 7/1975 | Cooper | |
| 4,607,486 A | 8/1986 | Cole | |
| 7,895,819 B2 * | 3/2011 | Deldalle | F02C 7/32 60/734 |
| 8,205,597 B2 * | 6/2012 | Brocard | F02C 7/22 123/457 |
| 8,276,360 B2 | 10/2012 | Poisson et al. | |
| 9,206,775 B2 | 12/2015 | Ripley et al. | |
| 9,828,916 B2 * | 11/2017 | Masuda | F02C 9/30 |
| 9,885,287 B2 * | 2/2018 | Striker | F02C 7/224 |
| 10,125,692 B2 | 11/2018 | Ernst | |
| 10,378,445 B2 | 8/2019 | Edwards et al. | |
| 10,408,133 B2 | 9/2019 | Wintgens et al. | |
| 10,590,852 B2 | 3/2020 | Suciu et al. | |
| 11,060,461 B2 | 7/2021 | Turney et al. | |
| 11,203,978 B2 * | 12/2021 | O'Rorke | F02C 7/236 |
| 11,441,485 B2 | 9/2022 | Herring | |
| 11,603,802 B2 * | 3/2023 | Durand | F02C 9/26 |
| 11,708,795 B1 * | 7/2023 | Mastrocola | F02C 7/14 60/39.281 |
| 11,781,484 B2 * | 10/2023 | Cocks | F02C 9/28 60/772 |

(Continued)

*Primary Examiner* — Alain Chau
(74) *Attorney, Agent, or Firm* — HANLEY, FLIGHT & ZIMMERMAN, LLC

(57) ABSTRACT

A turbo engine for an aircraft includes a gas turbine engine having a combustion section and a fuel system to provide pressurized fuel to the combustion section. The fuel system includes a fuel tank and a boost pump and a main pump driven by an accessory gearbox that is powered by a shaft of the turbo engine. The boost pump and the main pump are arranged in series. The fuel system also includes an auxiliary pump and a controller to operate the fuel system in (1) a first mode in which the boost pump and the main pump produce pressurized fuel for the turbo engine and the auxiliary pump is deactivated, and (2) a second mode in which the auxiliary pump is activated and produces the pressurized fuel for the turbo engine while bypassing the boost pump and the main pump.

20 Claims, 14 Drawing Sheets

(56) References Cited

U.S. PATENT DOCUMENTS

| | | | |
|---|---|---|---|
| 11,879,384 B2* | 1/2024 | Durand | F02C 3/06 |
| 11,898,496 B1* | 2/2024 | Susca | F02C 7/232 |
| 2010/0003148 A1* | 1/2010 | Deldalle | F02C 7/22 |
| | | | 417/409 |
| 2010/0018182 A1* | 1/2010 | Bader | F02C 9/30 |
| | | | 318/400.01 |
| 2011/0139123 A1* | 6/2011 | Brocard | F02C 9/28 |
| | | | 123/495 |
| 2016/0076452 A1* | 3/2016 | Striker | F02C 7/224 |
| | | | 60/734 |
| 2017/0321608 A1* | 11/2017 | Crowley | F02C 7/222 |
| 2018/0050812 A1* | 2/2018 | Ribarov | F02C 7/236 |
| 2019/0112987 A1* | 4/2019 | O'Rorke | F02K 3/10 |
| 2020/0140111 A1* | 5/2020 | O'Connor | F02C 7/236 |
| 2021/0062729 A1* | 3/2021 | Durand | F02C 9/26 |
| 2021/0079848 A1* | 3/2021 | Cocks | F02C 7/236 |
| 2021/0222625 A1* | 7/2021 | O'Rorke | F02C 7/236 |
| 2023/0184178 A1* | 6/2023 | Durand | F02C 3/06 |
| | | | 60/790 |
| 2023/0417190 A1* | 12/2023 | Mastrocola | F04B 49/007 |
| 2024/0026826 A1* | 1/2024 | Susca | F02C 9/263 |

\* cited by examiner

FUEL SYSTEMS FOR AIRCRAFT ENGINES

FIELD OF THE DISCLOSURE

The present disclosure relates generally to aircraft engines, more particularly, to fuel systems for aircraft engines.

BACKGROUND

Turbo engines (e.g., turbofan engines, turboprop engines, etc.), such as those used on aircraft, include a fuel system to provide a constant flow of fuel to the combustion section of the engine. The fuel system includes one or more pumps that are driven by the turbo engine. The pump(s) increase the pressure of the fuel to ensure a sufficient flow rate of fuel is available to the combustion section of the engine.

BRIEF DESCRIPTION OF THE DRAWINGS

A full and enabling disclosure of the presently described technology, including the best mode thereof, directed to one of ordinary skill in the art, is set forth in the specification, which makes reference to the appended FIGs., in which:

FIG. 2A shows the example fuel system operating in a first mode in which an example boost pump and an example main pump are used to supply pressurized fuel flow.

FIG. 4A shows the example fuel system operating in a first mode in which an example boost pump and an example main pump are used to supply pressurized fuel flow.

FIG. 5A shows the example fuel system operating in a first mode in which an example boost pump and an example main pump are used to supply pressurized fuel flow.

FIG. 6A shows the example fuel system operating in a first mode in which an example boost pump and an example main pump are used to supply pressurized fuel flow.

The figures are not to scale. Instead, the thickness of regions may be enlarged in the drawings. In general, the same reference numbers will be used throughout the drawing(s) and accompanying written description to refer to the same or like parts.

DETAILED DESCRIPTION

Figure 1:
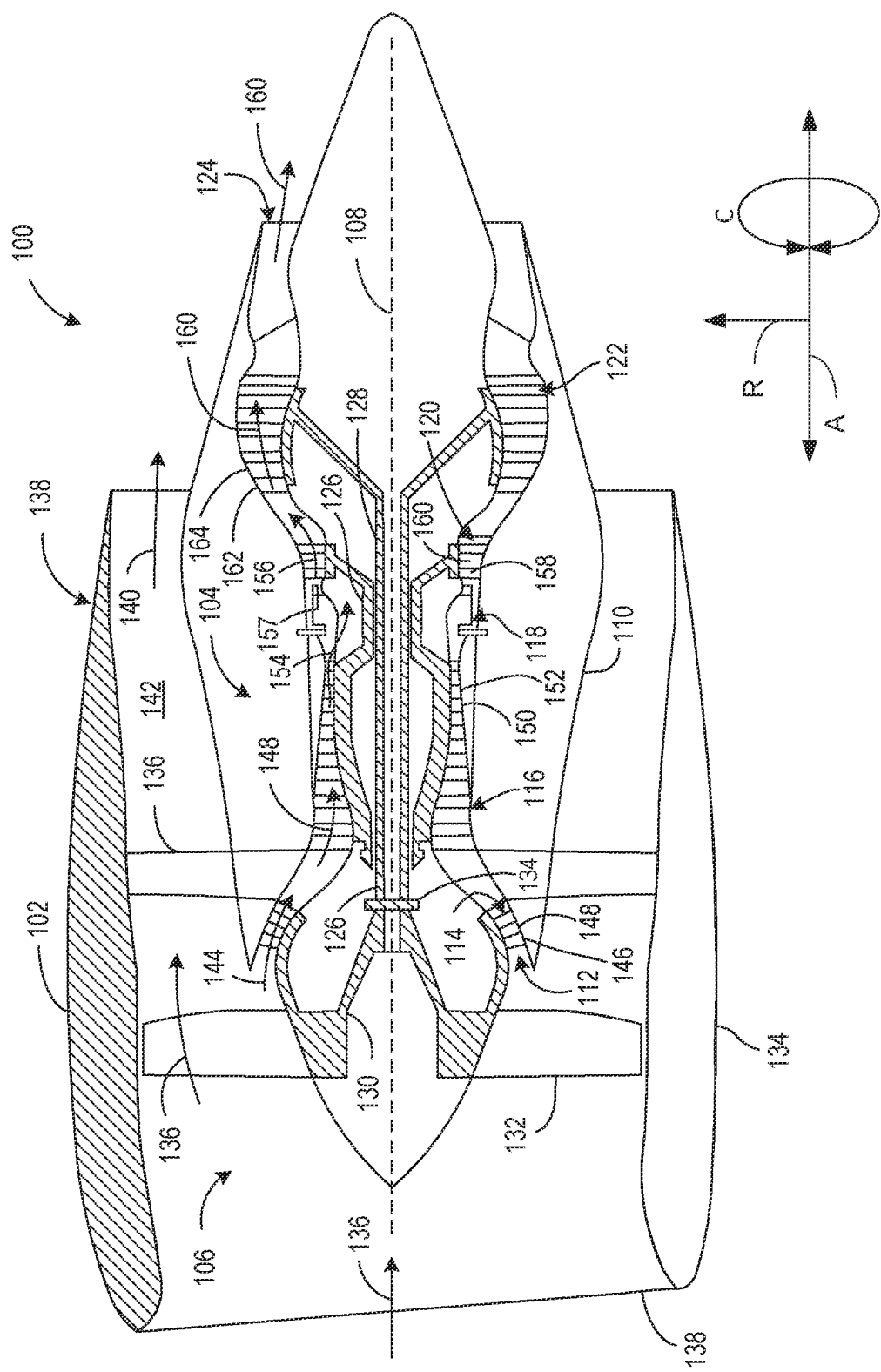
FIG. 1 is a schematic cross-sectional view of an example turbo engine in which examples disclosed herein can be implemented.

Reference now will be made in detail to embodiments or examples of the presently described technology, one or more examples of which are illustrated in the drawings. Each example or embodiment is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one embodiment or example can be used with another embodiment or example to yield a still further embodiment or example. Thus, it is intended that the presently described technology covers such modifications and variations as come within the scope of the appended claims and their equivalents.

The terms "upstream" and "downstream" refer to a relative location or direction with respect to fluid flow between an upstream location or source of fluid and a downstream location or end location of the fluid. For example, "upstream" refers to a location that is relatively closer to or in a direction that is toward the upstream location or source of fluid, whereas "downstream" refers to a location that is relatively closer to or in a direction toward the downstream location or end location of the fluid. As used herein, the terms "axial" and "longitudinal" both refer to a direction parallel to the centerline axis of a gas turbine engine (e.g., a turboprop, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to a relative location or direction along a radial line from the outer circumference of the gas turbine engine towards the centerline axis of the gas turbine engine, and "radially outward" refers to a relative location or direction along a radial line from the centerline axis of the gas turbine engine towards the outer circumference of the gas turbine engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Turbo engines (e.g., turbofan engines, turboprop engines, etc.), such as those used on aircraft, include a fuel system to supply a constant flow of pressured fuel to the combustion chamber of the engine. The fuel system includes a boost pump and a main pump arranged in series. The boost pump receives fuel from a fuel tank and increases the pressure of the fuel to a first pressure. The main pump receives the fuel from the boost pump and further increases the pressure to a higher, second pressure. The main pump is typically sized and powered to produce fuel flow at or above the pressure and flow demands of the turbo engine to ensure an adequate supply of fuel during operation. Therefore, in some known fuel systems, a portion of the pressurized fuel is recirculated back through the pumps and/or back to the fuel tank, sometimes referred to as recirculation flow.

The boost pump and the main pump are driven by an accessory gearbox that is powered by the high-pressure shaft of the turbo engine. Therefore, the boost pump and the main pump are in a fixed speed ratio with the turbo engine. When the turbo engine is operating at lower speeds, such as during idle (e.g., ground-idle or flight-idle), the boost pump and the main pump over produce pressurized fuel, which is then recirculated back through the fuel system. Therefore, at these lower speeds, the boost pump and the main pump are less efficient and produce waste heat that increases the temperature of the fuel.

Fuel systems are designed to withstand a certain temperature. Higher temperature fuel can congeal and form coke along the fuel lines and devices, which negatively affects the various fuel lines and devices (e.g., clogs the devices). Also, as mentioned above, some known systems include a recirculation flow. As such, the heated fuel is returned back to the fuel tank, which results in high fuel tank starting temperature. This degrades the fuel-oil thermal management system (FOTMS) and vehicle thermal management (VTMS) performance. Therefore, this increased heat during lower power modes is undesired. Some known systems attempt to address this problem by adding additional chillers or coolers to reduce the temperature of the fuel. These systems are expensive, complex, and add significant weight to the overall engine.

Disclosed herein are example fuel systems for aircraft engines that include an auxiliary pump that can be activated during certain phases or modes of operation to provide pressured fuel and bypass the boost pump and main pump. As such, the boost pump and main pump can be deactivated or isolated from the rest of the fuel system during these lower efficiency periods, such as during idle. This reduces or eliminates added heat to the fuel that would otherwise occur during these lower efficiency periods. In some examples, the auxiliary pump is an electrically-powered pump, which may be powered by an auxiliary power unit (APU) and/or an integrated power pack (IPP) of the aircraft. Therefore, in some examples, the fuel system may be referred to as a hybrid fuel system that utilizes both mechanically-powered and electrically-powered pumps.

In some examples, the fuel system is operable between a first mode and a second mode. In the first mode, the boost pump and the main pump operate as normal to provide a constant supply of pressurized fuel while the auxiliary pump is deactivated or off. In the second mode, the auxiliary pump is activated and provides the constant supply of pressurized fuel while the boost pump and main pump are deactivated and/or fluidly isolated from the main fuel circuit. In some examples, the fuel system is operated in the first mode while the engine is operating at higher powers/speeds, such as during take-off, climb, reverse thrust, etc., where the boost pump and the main pump are generally operating at a higher efficiency, and the fuel system is operated in the second mode while the turbo engine is operating at lower powers/ speeds, such as during idle or cruise, where the boost pump and the main pump are generally operating at a lower efficiency. The multiple modes helps prevent or limit the boost pump and main pump from operating inefficiently and adding heat to the fuel during lower speed phases. Operation in multiple modes prevents or reduces congealing and coke formation, and well as eliminates or reduces the need for chiller or coolers.

Disclosed herein are various configurations or arrangements of the auxiliary pump with the boost pump and main pump. Also disclosed herein are example fuel system controllers for controlling one or more device(s) (e.g., valves, pressure regulators, motors, etc.) to switch the fuel system between the first mode and the second mode. In some examples, the fuel system controller operates the fuel system in (1) the first mode in which the boost pump and the main pump produce pressurized fuel for the turbo engine and the auxiliary pump is deactivated, and (2) the second mode in which the auxiliary pump is activated and produces the pressurized fuel for the turbo engine while bypassing the boost pump and the main pump.

Referring now to the drawings, FIG. 1 is a schematic cross-sectional view of an example turbo engine 100 that can incorporate various examples disclosed herein. The example turbo engine 100 can be implemented on an aircraft and therefore referred to as an aircraft engine. In this example, the turbo engine 100 is a turbofan-type of engine. However, the principles of the present disclosure are also applicable to other types of engines, such as turboprop engines and engines without a nacelle, such as unducted fan (UDF) engines (sometimes referred to as propfans). Further, the example principles disclosed herein can be implemented on other types of engines, such as non-aircraft engines.

As shown in FIG. 1, the turbo engine 100 includes an outer bypass duct 102 (which may also be referred to as a nacelle, fan duct, or outer casing), a gas turbine engine 104 (which may also be referred to as a core turbine engine), and a fan section 106. The gas turbine engine 104 and the fan section 106 are disposed at least partially in the outer bypass duct 102. The gas turbine engine 104 is disposed downstream from the fan section 106 and drives the fan section 106 to produce forward thrust.

As shown in FIG. 1, the turbo engine 100 and/or the gas turbine engine 104 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turbo engine 100, such as to the left in FIG. 1, while the term "rearward" refers to a direction along the centerline axis 108 in the opposite direction, such as to the right in FIG. 1.

The gas turbine engine 104 includes a substantially tubular outer casing 110 (which may also be referred to as a mid-casing) that defines an annular inlet 112. The outer casing 110 of the gas turbine engine 104 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124.

The gas turbine engine 104 includes a high pressure shaft 126 ("HP shaft 126") that drivingly couples the HP turbine 120 and the HP compressor 116. The gas turbine engine 104 also includes a low pressure shaft 128 ("LP shaft 128") that drivingly couples the LP turbine 122 and the LP compressor 114. The LP shaft 128 also couples to a fan shaft 130.

The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (i.e., an indirect-drive or geared-drive configuration). While in this example the gas turbine engine 104 includes two compressor and two turbines, in other examples, the gas turbine engine 104 may only include one compressor and one turbine. Further, in other examples, the gas turbine 104 can include more than two compressors and turbines. In such examples, the gas turbine engine 104 may include more than two drive shafts or spools.

As illustrated in FIG. 1, during operation of the turbo engine 100, air 136 enters an inlet portion 138 of the turbo engine 100. The air 136 is accelerated by the fan blades 132 (sometimes considered a low-pressure compressor). A first portion 140 of the air 136 flows into a bypass airflow passage 142, while a second portion 144 of the air 136 flows into the inlet 112 of the gas turbine engine 104 (and, thus, into the LP compressor 114). One or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor vanes 152 coupled to the HP shaft 126 further compress the second portion 144 of the air 136 flowing through the HP compressor 116. This provides compressed air 154 to the combustion section 118 where it mixes with fuel and burns to provide combustion gases 156. Fuel is injected into the combustion section 118 by one or more nozzles 157. The turbo engine 100 includes a fuel system to provide pressurized fuel through the nozzles 157 to the combustion section 118. Example fuel systems are disclosed in further detail herein.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the gas turbine engine 104 through the exhaust section 124 thereof. The combustion gases 156 mix with the first portion 140 of the air 136 from the bypass airflow passage 142. The combined gases exit an exhaust nozzle 170 (e.g., a converging/diverging nozzle) of the bypass airflow passage 142 to produce propulsive thrust.

Figure 2A:
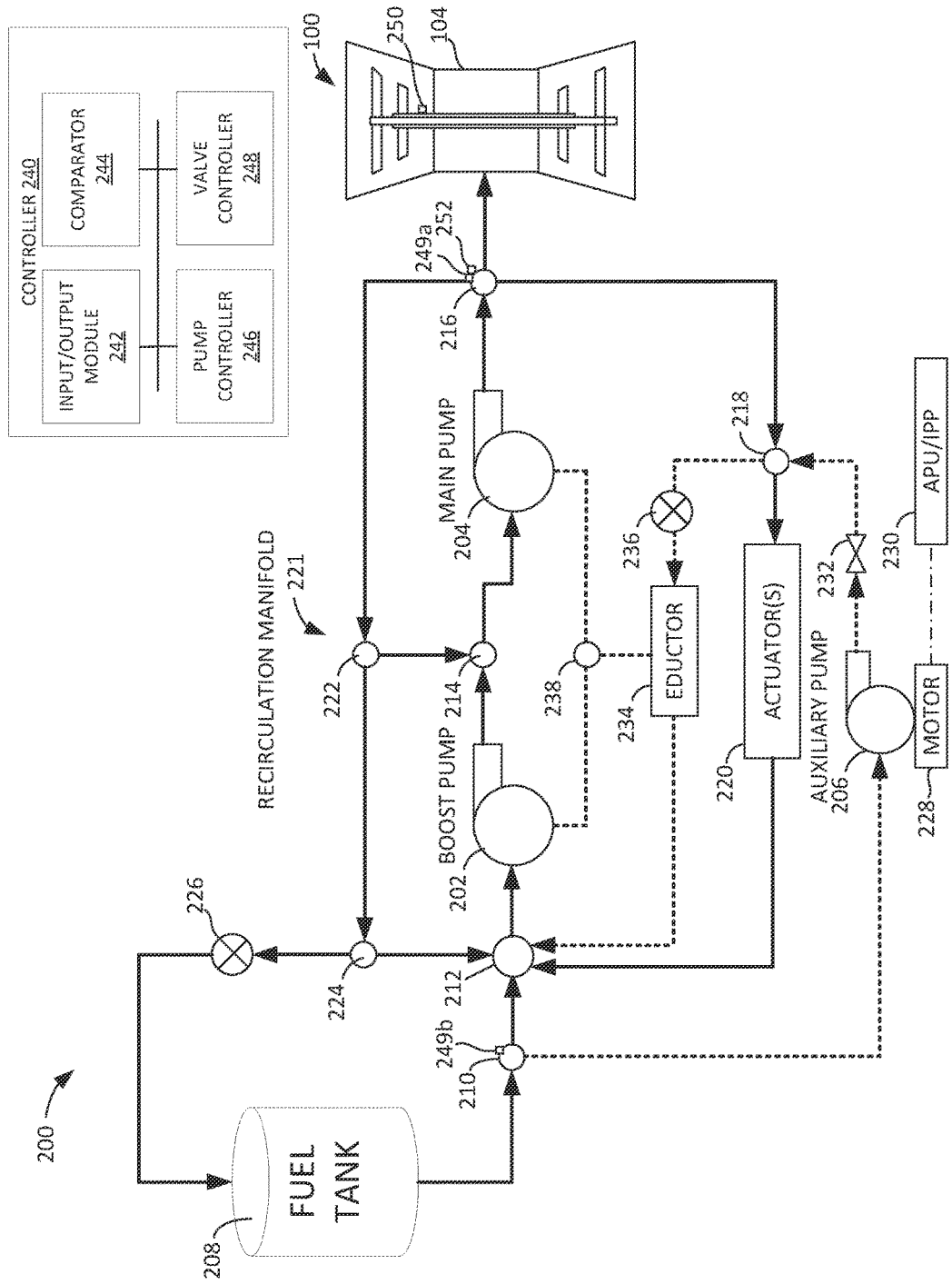
FIG. 2A is a schematic diagram of a first example fuel system that can be implemented on the example turbo engine.

FIG. 2A is a schematic diagram of a first example fuel system 200 that can be implemented in connection with the example turbo engine 100 of FIG. 1. The first fuel system 200 is used to supply fuel to the combustion section 118 (FIG. 1) of the turbo engine 100 and one or more other locations (e.g., devices, systems, etc.), as disclosed in further detail herein.

In the illustrated example, the first fuel system 200 includes a boost pump 202 and a main pump 204 arranged in series. During normal or higher-power states of the gas turbine engine 104 (e.g., above idle), the first fuel system 200 operates in a first mode in which the boost pump 202 and the main pump 204 act as the main pumping source to produce or provide pressurized fuel for the turbo engine 100 and the other location(s).

In the illustrated example, the first fuel system 200 also includes an auxiliary pump 206 (e.g., an electric-driven pump). In this example, the auxiliary pump 206 is arranged in parallel with the boost pump 202 and the main pump 204. During lower-power states (e.g., idle), the first fuel system 200 operates in a second mode in which the auxiliary pump 206 is activated to supply fuel to the engine 100 and the other location(s), as disclosed in further detail herein.

Figure 2B:
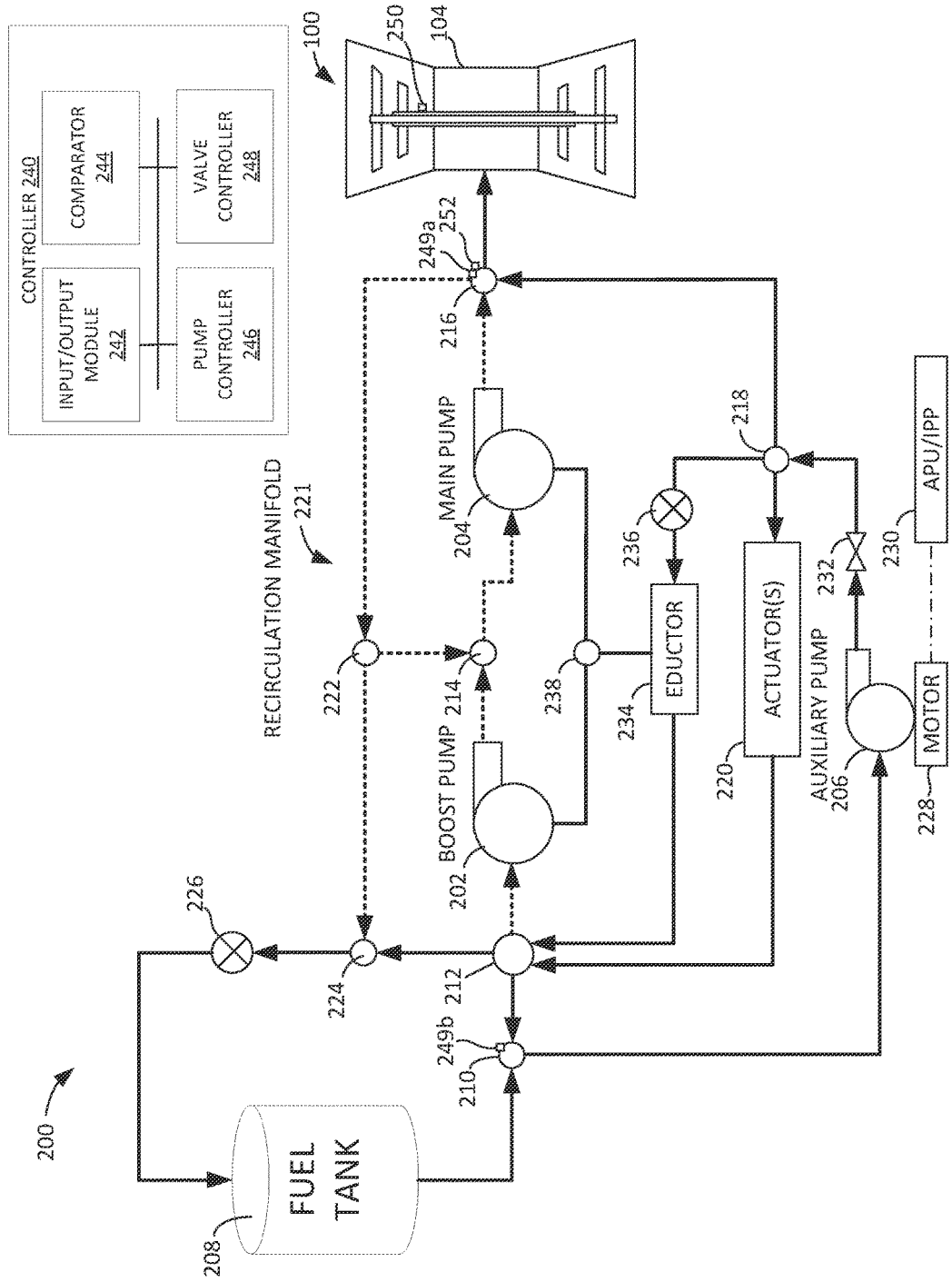
FIG. 2B shows the first example fuel system of FIG. 2A operating in a second mode in which an example auxiliary pump is used to supply pressurized fuel flow.

FIG. 2A shows the first fuel system 200 in the first mode and FIG. 2B shows the first fuel system 200 in the second mode. The first fuel system 200 can switch between the first and second modes based on an operating state (e.g., speed) of the turbo engine 100.

FIGS. 2A and 2B include arrow lines between various components. The arrow lines represent any type of fluid connection, such as a fluid line, a hose, a tube, a connector, a port, and/or other structure or opening that fluidly couples two components. Therefore, any two components with an arrow between them can be considered fluidly coupled. In the illustrated example of FIGS. 2A and 2B, solid arrow lines represent active fluid lines in which fluid is present and flowing, while dotted arrow lines represent fluid lines that are shut-off or not active and fluid is not flowing. FIGS. 2A and 2B also include circles that represent nodes or joints where one or more fluid paths connect. These nodes or joints can include any type of fluid line, hose, connector, port, etc. These solid lines, dotted lines, and nodes are similarly used in connection with the other fuel systems disclosed in further detail in conjunction with FIGS. 4A, 4B, 5A, 5B, 6A, 6B, 7, and 8.

The boost pump 202 and the main pump 204 are driven by the gas turbine engine 104 of the turbo engine 100. For example, referring briefly to FIG. 3, the turbo engine 100 includes an accessory gearbox 300. The accessory gearbox 300 is driven or powered by a shaft 302, which is in gear with and driven by the LP shaft 128 of the gas turbine engine 104. For example, the shaft 302 may be in gear with the LP shaft 128 via bevel gears 304. Therefore, the accessory gearbox 300 is powered by the LP 128 of the turbo engine 104.

The accessory gearbox 300 may provide power to one or more devices. The accessory gearbox 300 may have one or more off-take shafts to drive the one or more accessories or devices, such as pumps, generators, etc. In this example, the boost pump 202 and the main pump 204 are driven by the accessory gearbox 300. Therefore, the boost pump 202 and the main pump 204 are driven by the gas turbine engine 104.

The accessory gearbox 300 provides a fixed or constant gear ratio between the gas turbine engine 104 and the boost and main pumps 202, 204. Therefore, the boost and main pumps 202, 204 have a fixed speed ratio with the turbo engine 100. For example, when the gas turbine engine 104 increases speed, the boost and main pumps 202, 204 increase speed. In some examples, the turbo engine 100 can include clutches 306, 308, disclosed in further detail herein.

Referring back to FIG. 2A, the first example fuel system 200 includes a fuel tank 208 that stores fuel (e.g., Jet A, Jet A1, kerosene, etc.). In some examples, the fuel tank 208 is located in one or both of the wings of the aircraft. In other examples the fuel tank 208 can be disposed in another location on the aircraft (e.g., in the fuselage).

As mentioned above, FIG. 2A shows the first fuel system 200 operating in the first mode. In the first mode, fuel flows from the fuel tank 208 through a first node 210 and a second node 212 to the boost pump 202. The boost pump 202 increases the pressure of the fuel to a priming pressure (e.g., 200 pounds-per-square-inch (psi)). The fuel exits the boost pump 202 and flows through a third node 214 to the main pump 204. The main pump 204 increases the pressure of the fuel from the priming pressure to a desired or set pressure (e.g., 1000 psi).

The pressure output by the main pump 204 may be based on the size of the main pump 204 and the gear ratio with the gas turbine engine 104. The main pump 204 is often sized and geared to increase the pressure of the fuel to a pressure that is above that required by the gas turbine engine 104 and other devices to ensure an adequate flow rate of fuel is available.

The pressurized fuel output by the main pump 204 flows to a fourth node 216 where the fuel is distributed to one or more locations. In some examples, the fourth node 216 is a fuel control unit or fuel metering unit. At least some of the pressurized fuel at the fourth node 216 is directed to the gas turbine engine 104 of turbo engine 100 where it can be injected into the combustion section 118 (FIG. 1).

Therefore, the boost pump 202 and the main pump 204 are arranged in series between the fuel tank 208 and the gas turbine engine 104 of the turbo engine 100. Additionally, in some examples, some of the fuel can be used as a high-pressure fluid source for one or more devices. In the illustrated example, at least some of the pressurized fuel is provided through a fifth node 218 to one or more actuator(s) 220. The actuator(s) 220 can include, for example, an actuator for inlet guide vanes on the turbo engine 100 or a variable area exhaust on the turbo engine 100. The pressurized fuel acts as a hydraulic power source for operating these actuator(s) 220. Additionally or alternatively, the fuel can be used for other devices such as valve, solenoids, etc. The fuel is then provided back to the second node 212 where the fuel is again routed or directed through the boost pump 202.

In the illustrated example of FIG. 2A, the first fuel system 200 includes a recirculation manifold 221, which may also be referred to as a bypass manifold or recirculation flow path. At least a portion of the pressurized fuel from the fourth node 216 is directed through the recirculation manifold 221 and back to at least one of the boost pump 202, the main pump 204, or the fuel tank 208. For example, some of the fuel is routed through a sixth node 222 and the third node 214 back to the main pump 204 and/or through a seventh node 224 and the second node 212 back to the boost pump 202. In the illustrated example, the first fuel system 200 includes a valve 226. In some examples, the valve 226 is open and allows fuel to flow back to the fuel tank 208.

The first fuel system 200 generally operates efficiently during normal or higher-power modes where the turbo engine 100 utilizes a higher amount of fuel, such as during take-off, climb, reverse thrust, etc. However, when the turbo engine 100 is operating at lowers speeds where less fuel is needed, such as during idle (on the ground or in flight) or cruise, the boost pump 202 and the main pump 204 are less efficient and add waste heat to the fuel being pumped through the pumps 202, 204. This added heat can have negative results such as contributing to fuel lacquering or coke formation in the fluid lines. Further, in instances where the fuel is recirculated back to the fuel tank 208, this increases the temperature of the fuel in the fuel tank 208 and, thus, increases the starting temperature of the fuel.

Therefore, during lower efficiency operating period (e.g., during idle or cruise), the first fuel system 200 can switch to operate in the second mode shown in FIG. 2B. In the second mode, the auxiliary pump 206 is activated or turned on. In this example, the auxiliary pump 206 is driven or powered by an electric motor 228. As such, in this example, the auxiliary pump 206 is an electrically-powered pump. In this example, the electric motor 228 is powered by an auxiliary power unit (APU) or an integrated power pack (IPP) 230 of the aircraft.

Additionally or alternatively, in other examples, the electric motor 228 can receive power from another source, such as a ground cart and/or a generator driven by the turbo engine 100.

Figure 3:
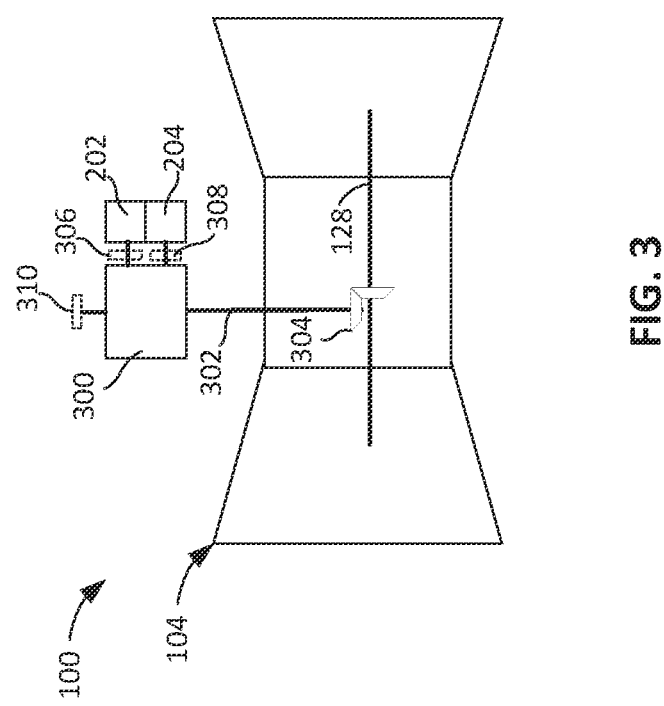
FIG. 3 is a schematic diagram of an example accessory gearbox derived by the example turbo engine of FIG. 1 and used to power the example boost pump and the example main pump.

As another example, the auxiliary pump 206 can be driven by a gearbox with a clutch. For example, FIG. 3 shows an example clutch 310 associated with the accessory gearbox 300. The auxiliary pump 206 can be driven by an offtake shaft of the accessory gearbox 300 via the clutch 310. The clutch 310 may be controlled by the controller 240. In the illustrated example of FIG. 2A, the dash-dot represents an electrical connection between the APU/IPP 230 and the electric motor 228.

As shown in FIG. 2B, fuel from the first node 210 is directed to the auxiliary pump 206. The auxiliary pump 206 increases the pressure of the fuel up to the desired or set pressure. The fuel exiting the auxiliary pump 206 flows through a check valve 232 (e.g., a one-way valve, a backflow preventer) to the fifth node 218. At least some of the fuel is directed to the fourth node 216 and then to the gas turbine engine 104. As can be appreciated, the auxiliary pump 206 is arranged in parallel with the boost pump 202 and the main pump 204 between the fuel tank 208 and the turbo engine 100. Therefore, the flow of fuel through the auxiliary pump 206 bypasses the boost pump 202 and the main pump 204.

Further, as shown in FIG. 2B, at least a portion of the pressurized fuel produced by the auxiliary pump 206 at the fifth node 218 is directed to the one or more actuator(s) 220 to provide hydraulic pressure to operate the one or more actuator(s) 220. The pressurized fuel is then directed to the second node 212, which is then directed back to the first node 210 and back through the auxiliary pump 206, and the cycle is repeated. As such, the auxiliary pump 206 provides fuel to the gas turbine engine 104 and to the actuator(s) 220.

In the illustrated example of FIG. 2B, the first fuel system 200 includes an eductor 234 (e.g., a jet pump, a venturi pump) and a valve 236 (which may be referred to as a flow control valve or diverter valve). In the second mode, the valve 236 is open. Therefore, at least a portion of the pressurized fuel produced by the auxiliary pump 206 in the second mode is routed through the eductor 234. The eductor 234 is fluidly coupled by an eighth node 238 to the boost pump 202 and the main pump 204. The eductor 234 acts as a passive pump. In particular, when high pressure fuel is flowing through the eductor 234, the eductor 234 draws (via suction) remaining fuel in the boost pump 202 and the main pump 204. The boost pump 202 and the main pump 204 are still being driven by the accessory gearbox 300. Therefore, the eductor 234 evacuates the boost pump 202 and the main pump 204. This prevents fuel heat addition that would otherwise be caused by the boost pump 202 and the main pump 204. Fuel extracted by the eductor 234 is directed back to the to the second node 212, which is then directed back to the first node 210 and back through the auxiliary pump 206, and the cycle is repeated. While some fuel may percolate to the boost pump 202 and/or the main pump 204, the fuel is evacuated by the eductor 234.

In some examples, some of the fuel from the second node 212 may also flow through the seventh node 224 and the valve 226 back to the fuel tank. In some examples, the first fuel system 200 may include separate eductors for the boost pump 202 and the main pump 204. Therefore, in the second mode, the boost pump 202 and the main pump 204 are fluidly isolated or disconnected from providing fuel to the gas turbine engine 104 and/or the actuators(s) 220. In this example, the boost pump 202 and the main pump 204 are disconnected hydraulically. In other examples, the boost pump 202 and the main pump 204 can be disconnected in a mechanically (e.g., via a clutch), disclosed in further detail here. In some examples, when the first fuel system 200 is operating in the second mode, the recirculation manifold 221 has no flow or reduced flow (e.g., less than 50% of normal flow rate).

As can be appreciated, use of the auxiliary pump 206 eliminates the use of the boost pump 202 and the main pump 204 during lower efficiency modes, which eliminates or reduces added heat to the fuel. Therefore, using the first fuel system 200 in the second mode reduces the amount of heat added to the fuel compared to known systems. This eliminates or reduces the need for chillers or coolers as seen in known systems. Further, the example auxiliary pump 206 is relatively small. For example, an electric pump that can output 10-20 gallons-per-minute with 100-200 psid boost may be about 10 in×5 in×5 in in size and only weight about 10-20 lbs. Therefore, the addition of the auxiliary pump 206 does not add considerable weight or size to the first fuel system 200. However, in other examples, the pump size, flow capacity, weight, etc. of the auxiliary pump 206 can be larger or smaller, depending on the application.

In the illustrated example of FIGS. 2A and 2B, the first example fuel system 200 includes a fuel system controller 240 (referred to herein as the controller 240) to operate the various devices and control the operation of the first fuel system 200. In particular, the controller 240 can operate the various devices of the first fuel system 200 to switch the first fuel system 200 between the first mode (FIG. 2A) and the second mode (FIG. 2B). The controller 240 is communicatively coupled to one or more sensors (disclosed in further detail below), the electric motor 228, the valves 226, 236, and/or any other device that controls and/or monitors various parameters of the first fuel system 200.

The controller 240 of FIGS. 2A and 2B may be instantiated (e.g., creating an instance of, bring into being for any length of time, materialize, implement, etc.) by programmable circuitry such as a Central Processor Unit (CPU) executing first instructions. Additionally or alternatively, the controller 240 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 2A and 2B may, thus, be instantiated at the same or different times. Some or all of the circuitry of FIGS. 2A and 2B may be instantiated, for example, in one or more threads executing concurrently on hardware and/or in series on hardware. Moreover, in some examples, some or all of the circuitry of FIGS. 2A and 2B may be implemented by microprocessor circuitry executing instructions and/or FPGA circuitry performing operations to implement one or more virtual machines and/or containers.

In the illustrated example of FIGS. 2A and 2B, the controller 240 includes an input/output module 242, a comparator 244, a pump controller 246, and a valve controller 248. The input/output module 242 receives signals from one or more sensors that measure one or more parameters or parameter values of the first fuel system 200 and/or the gas turbine engine 104. The comparator 244 compares the measured values of the parameter(s) to one or more thresholds or threshold ranges. Based on whether the parameter(s) satisfy the thresholds or threshold ranges, the controllers 246, 248 can operate one or more of the devices to switch the first fuel system 200 between the first mode and the second mode.

The pump controller 246 controls the electric motor 228 of the auxiliary pump 206. In particular, the pump controller 246 can activate or deactivate the electric motor 228 to start or stop the auxiliary pump 206. The pump controller 246 can also increase or decrease the speed of the electric motor 228 to achieve a desired fuel pressure. The valve controller 248 controls the states of the valves 226, 236. For instance, the valves 226, 236 can be operated between an open state and a closed state (and/or any state therebetween (e.g., half open)).

As disclosed above, the first fuel system 200 can include one or more sensors (e.g., pressure sensors, flow sensors, speed sensors, etc.) to measure and/or monitor one or more parameters of the first fuel system 200 and/or the gas turbine engine 104. The comparator 244 compares the parameter(s) to one or more thresholds. If a parameter satisfies (e.g., exceeds) a threshold, for example, the controller 240 may operate the first fuel system 200 to switch to or remain in the second mode, whereas if the parameter does not satisfy the threshold, the controller 240 may operate the first fuel system 200 to switch to or remain in the first mode. Therefore, the controller 240 uses one or more parameters to determine when to switch between the first and second modes.

In some examples, the parameter is efficiency (e.g., an efficiency level or value) of the boost pump 202 and the main pump 204. The comparator 244 may compare the efficiency to an efficiency threshold. As an example operation, assume the first fuel system 200 is operating in the first mode shown in FIG. 2A. If the efficiency is above an efficiency threshold, such as during higher-power modes of the gas turbine engine 104, the first fuel system 200 continues to operate in the first mode in which the boost pump 202 and the main pump 204 are used to increase the pressure of the fuel for use by the gas turbine engine 104 and the actuator(s) 220. However, if the efficiency falls below the efficiency threshold, such as during lower-power modes of the gas turbine engine 104, the controller 240 switches the first fuel system 200 to the second mode.

In some examples, the efficiency is based on or defined by one or more other parameters, such as a temperature of the fuel at a certain location or a temperature difference between two locations. For example, as shown in FIGS. 2A and 2B, the first fuel system 200 includes a first temperature sensor 249a for measuring the temperature of the fuel output by the main pump 204 (at the fourth node 216) and a second temperature sensor 249b at the first node 210. The comparator 244 can compare the temperature difference (e.g., the temperature change across the boost pump 202 and the main pump 204 between first and fourth nodes 210, 216) to a temperature threshold. If the temperature difference is below the temperature threshold (indicating the boost pump 202 and the main pump 204 are operating relatively efficiently, such as during higher-power modes), the first fuel system 200 continues to operate in the first mode.

However, if the temperature difference exceeds the temperature threshold (indicating the boost pump 202 and the main pump 204 are not operating as efficiently, such as during lower-power modes), the controller 240 can switch the first fuel system 200 to the second mode. In particular, the pump controller 246 activates the electric motor 228 to start the auxiliary pump 206 and the valve controller 248 opens the valve 236. Fuel begins to follow the flow path shown in FIG. 2B. As such, the auxiliary pump 206 provides the main pumping means for increasing the pressure of the fuel for use by the gas turbine engine 104 and the actuator(s) 220. Therefore, the controller 240 operates the first fuel system 200 in (1) a first mode in which the boost pump 202 and the main pump 204 produce pressurized fuel for the turbo engine 100 and the auxiliary pump 206 is deactivated, and (2) a second mode in which the auxiliary pump 206 is activated and produces the pressurized fuel for the turbo engine 100 while bypassing the boost pump 202 and the main pump 204.

As another example, the efficiency may be based on or defined by the speed of the gas turbine engine 104. For example, as shown in FIGS. 2A and 2B, the first fuel system 200 includes a speed sensor 250 for measuring the speed of the gas turbine engine 104. The speed may correspond to a speed of the LP shaft 128 or the HP shaft 126. As an example operation, assume the first fuel system 200 is operating in the first mode shown in FIG. 2A. In the first mode, the electric motor 228 is deactivated and the valve 236 is closed. The input/output module 242 receives speed measurements from the speed sensor 250. The comparator 244 compares the speed to a speed threshold. In some examples, the speed threshold corresponds to a speed that is above idle speed or cruise speed. If the speed is above the speed threshold (which corresponds to speeds at which the boost pump 202 and the main pump 204 are operating at higher efficiency), the first fuel system 200 continues to operate in the first mode in which the boost pump 202 and the main pump 204 are used to increase the pressure of the fuel for use by the gas turbine engine 104 and the actuator(s) 220. If the speed falls below the speed threshold (which corresponds to speeds at which the boost pump 202 and the main pump 204 are operating at lower efficiency), the controller 240 switches the first fuel system 200 to the second mode.

Additionally or alternatively, the controller 240 can control the first fuel system 200 based on one or more other parameters or parameter values. For example, the first fuel system 200 can include a pressure sensor 252 at the fourth node 216 to measure the pressure of the fuel before flowing to the gas turbine engine 104. Depending on the pressure of the fuel, the controller 240 can switch the first fuel system 200 between the first and second modes. In some examples, the controller 240 can measure or monitor multiple parameters at the same time. The controller 240 may utilize one or more of these parameters to determine when to switch between the first and second modes.

In some examples, the auxiliary pump 206 can be used for other purposes. For example, during engine shut down, the auxiliary pump 206 can be activated (or remain activated) to recirculate fuel through the recirculation manifold 221 and back to the fuel tank 208. This helps mitigate thermal soak-back and reduces and coke formation.

Figure 4A:
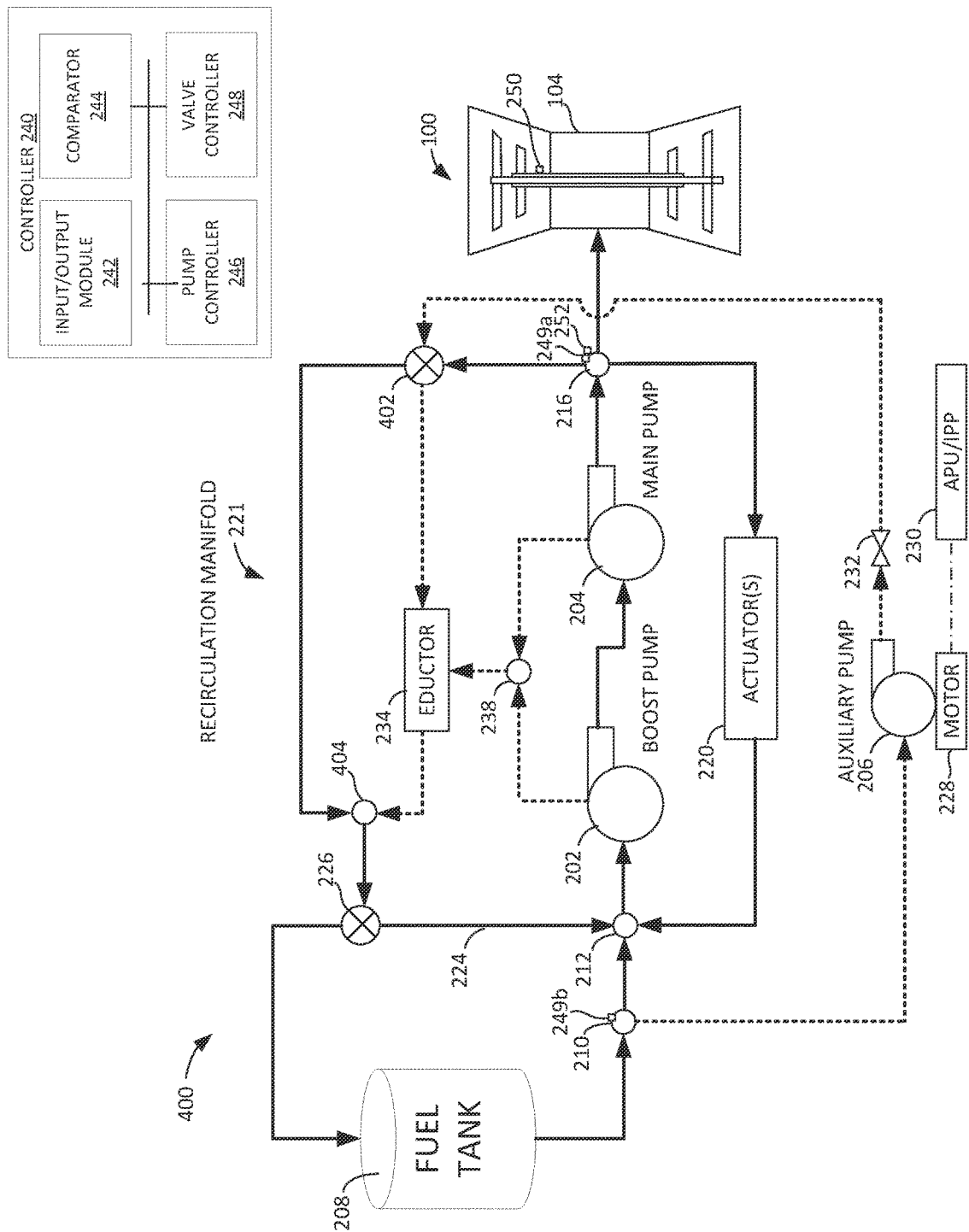
FIG. 4A is a schematic diagram of a second example fuel system that can be implemented on the example turbo engine.
Figure 4B:
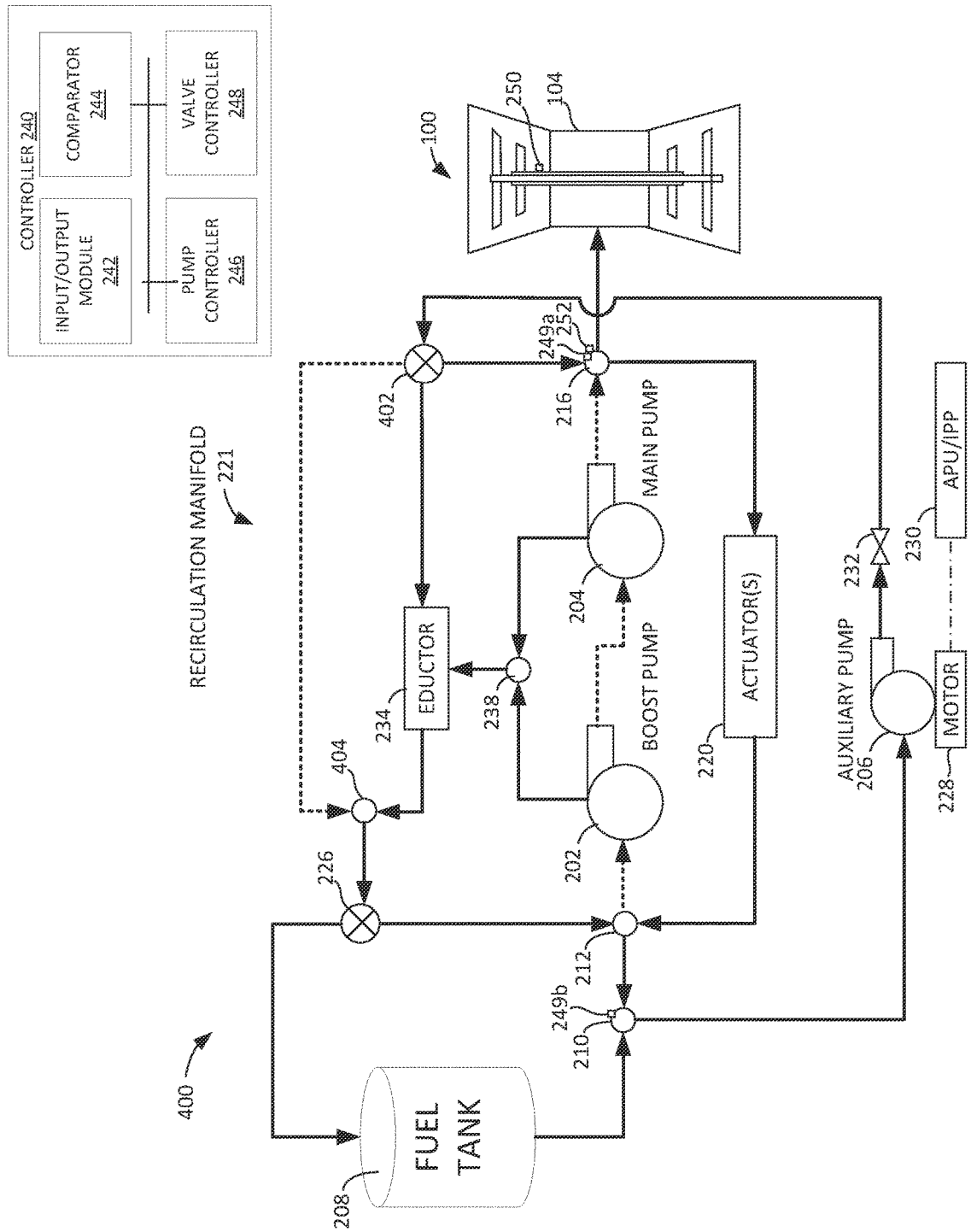
FIG. 4B shows the second example fuel system of FIG. 4A operating in a second mode in which an example auxiliary pump is used to supply pressurized fuel flow.

FIGS. 4A and 4B are schematic diagrams of a second example fuel system 400 that can be implemented in connection with the gas turbine engine 104. Those components of the second example fuel system 400 that are substantially similar or identical to the components of the first example fuel system 200 disclosed above in connection with FIGS. 2A and 2B and that have structure and/or functions substantially similar or identical to the structure and/or functions of those components will not be described in detail again below. Instead, the interested reader is referred to the above corresponding descriptions. To facilitate this process, the same reference numbers are used for like structures.

FIG. 4A shows the second example fuel system 400 operating in the first mode. The second fuel system 400 is substantially the same as the first fuel system 200 disclosed in connection with FIGS. 2A and 2B. However, in the second fuel system 400 of FIGS. 4A and 4B, the eductor 234 is part of the recirculation manifold 221 (e.g., the recirculation circuit or flow path). As shown in FIG. 4A, fuel from the fourth node 216 flows to a valve 402 (e.g., a three-way valve). The valve 402 is controlled by the valve controller 248. When the second fuel system 400 is in the first mode, as shown in FIG. 4A, the valve 402 directs the fuel to a node 404, which bypasses the eductor 234. The fuel at the node 404 can flow to the valve 226, which can direct the fuel to the second node 212 for recirculation and/or back to the fuel tank 208.

Referring to FIG. 4B, when the second fuel system 400 is operating in the second mode, the auxiliary pump 206 is activated. Further, the valve 402 is switched to direct fuel through the eductor 234, which draws or empties the remaining fuel from the boost pump 202 and the main pump 204. The controller 240 can operate substantially the same as disclosed in connection with the first fuel system 200 to operate the devices to switch the second fuel system 400 between the first mode (FIG. 4A) and the second mode (FIG. 4B) based on one or more measured parameters (e.g., efficiency, temperature, speed, etc.).

Figure 5A:
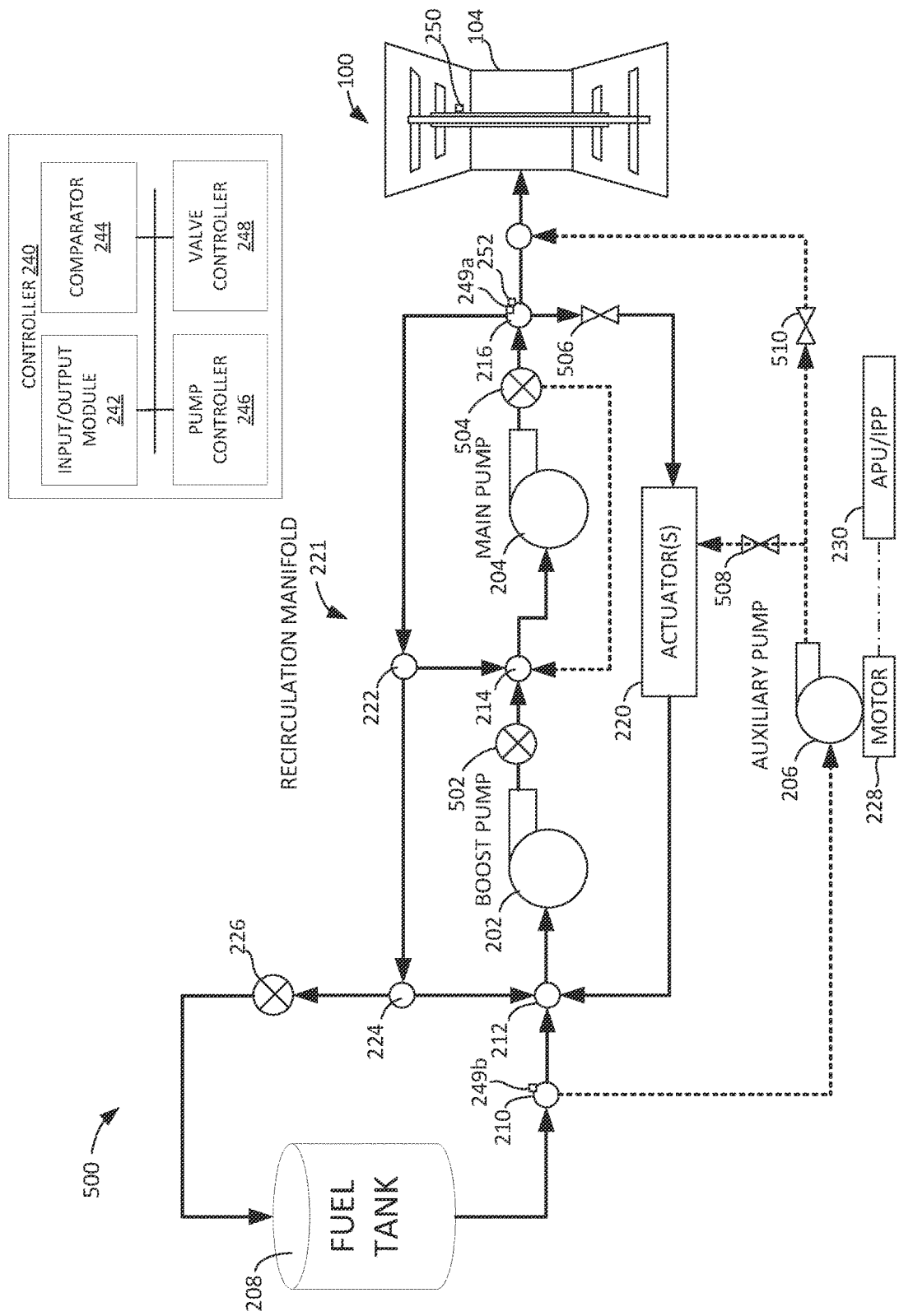
FIG. 5A is a schematic diagram of a third example fuel system that can be implemented on the example turbo engine.
Figure 5B:
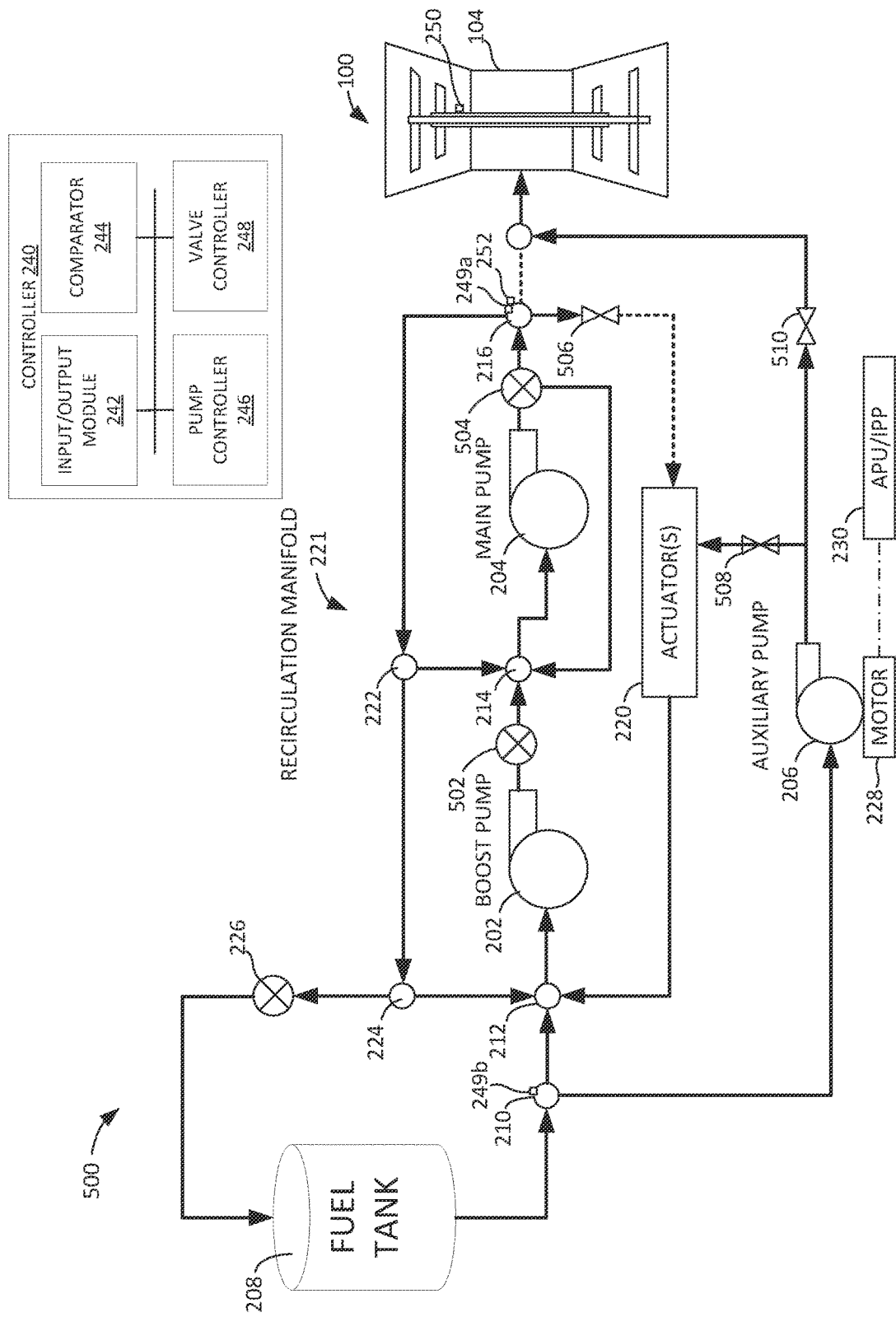
FIG. 5B shows the third example fuel system of FIG. 5A operating in a second mode in which an example auxiliary pump is used to supply pressurized fuel flow.

FIGS. 5A and 5B are schematic diagrams of a third example fuel system 500 that can be implemented in connection with the gas turbine engine 104. Those components of the third fuel system 500 that are substantially similar or identical to the components of the first example fuel system 200 and/or the second example fuel system 400 disclosed above in connection with FIGS. 2A, 2B, 4A, and 4B and that have structure and/or functions substantially similar or identical to the structure and/or functions of those components will not be described in detail again below. Instead, the interested reader is referred to the above corresponding descriptions. To facilitate this process, the same reference numbers are used for like structures.

FIG. 5A shows the third fuel system 500 operating in the first mode. As shown in FIG. 5A, the third fuel system 500 includes a flow valve 502 between the boost pump 202 and the main pump 204 and an idler valve 504 downstream of the main pump 204. During the first mode, the flow valve 502 and the idler valve 504 are open (e.g., fully open). Fuel at the fourth node 216 is distributed to the gas turbine engine 104, the actuator(s) 220, and/or through recirculation manifold 221 similar to the flow paths disclosed in connection with the first fuel system 200 in FIG. 2A. In the illustrated example, the third fuel system 500 includes a check valve 506 between the fourth node 216 and the actuator(s) 220.

As shown in FIG. 5A, the first node 210 is fluidly coupled to the auxiliary pump 206. However, in the first mode of operation, the auxiliary pump 206 is off or deactivated. As such, no fuel flows through the auxiliary pump 206. As shown in FIG. 5A, the outlet of the auxiliary pump 206 is fluidly coupled to the actuator(s) 220 by a check valve 508 and to the gas turbine engine 104 by a check valve 510. During the first mode, the check valves 508, 510 prevent fluid flow to the auxiliary pump 206.

FIG. 5B shows the example fuel system 500 in the second mode. In the second mode, the pump controller 246 activates the auxiliary pump 206. As shown in FIG. 5B, fuel from the first node 210 is directed to the auxiliary pump 206. The auxiliary pump 206 increases the pressure of the fuel. The pressurized fuel is directed through the check valve 508 to the actuator(s) 220 and/or through the check valve 510 to the gas turbine engine 104. Therefore, similar to the first and second fuel systems 200, 400, the flow of fuel through the auxiliary pump 206 bypasses the boost pump 202 and the main pump 204 in the second mode.

Also, in the second mode, the valve controller 248 operates the idler valve 504 to direct fuel back to the third node 214 and, thus, to the inlet of the main pump 204. As such, fuel is recirculated through the main pump 204. The use of the idler valve 504 allows the main pump 204 to run at regular speeds provided by the accessory gearbox 300 (FIG. 3) while providing limited work on the fuel passing through the main pump 204.

Further, in the second mode, the valve controller 248 partially closes the flow valve 502, which reduces the load on the boost pump 202. The flow valve 502 can modulate the boost pump flow to meet thermal needs of the gas turbine engine 104. This also allows the power and thermal impact on the boost pump 202 to be scheduled as a function of engine need when the main pump 204 is idled. The flow valve 502 and the idler valve 504 allow lower-work and higher thermal efficiency, while maintaining a small amount of fuel flow for lubricating the bearings of the pumps 202, 204.

The controller 240 can operate substantially the same as disclosed in connection with the first fuel system 200 and the second fuel system 400 to operate the devices to switch the third fuel system 500 between the first mode (FIG. 5A) and the second mode (FIG. 5B) based on one or more measured parameters (e.g., efficiency, temperature, speed, etc.).

Figure 6A:
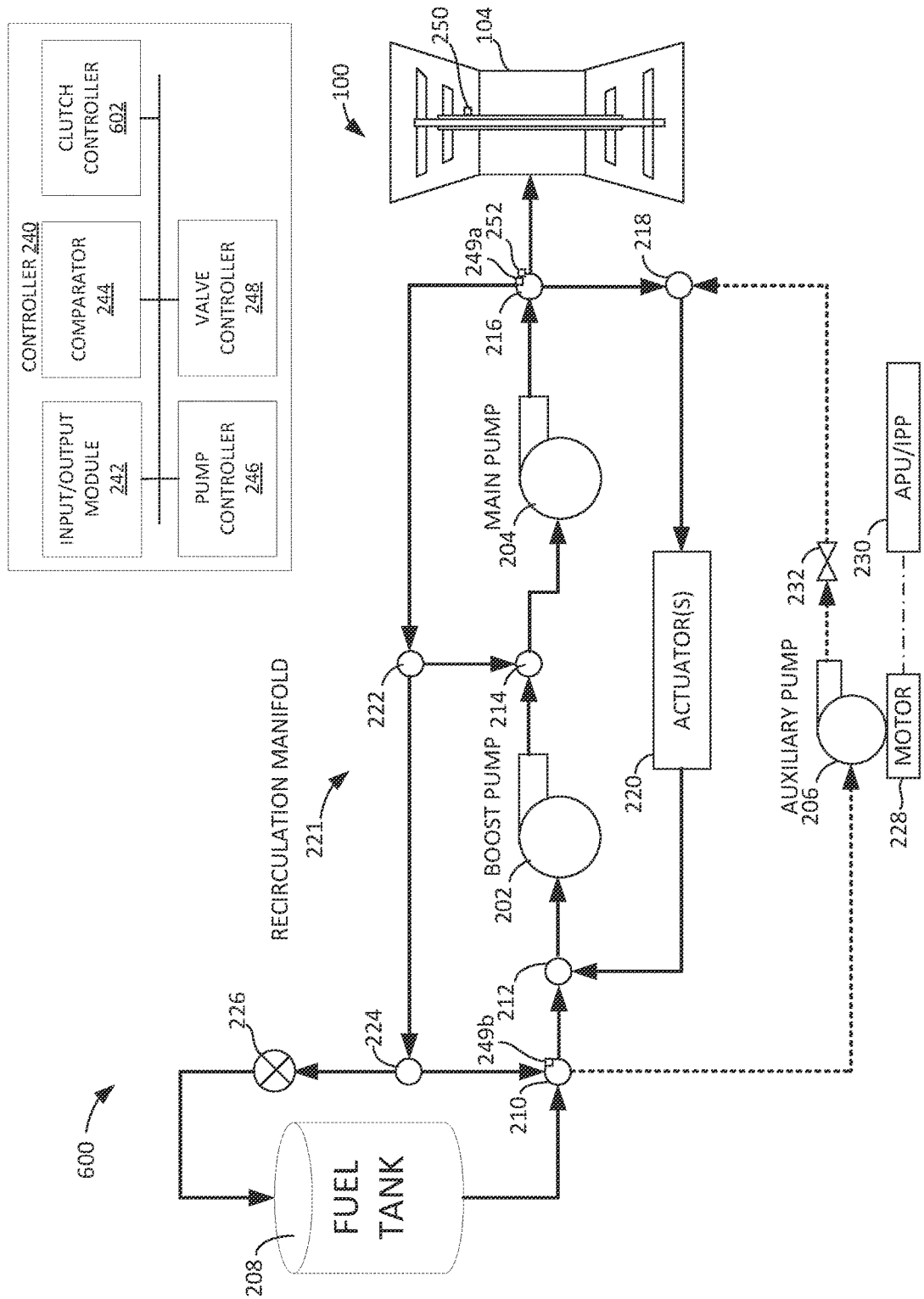
FIG. 6A is a schematic diagram of a fourth example fuel system that can be implemented on the example turbo engine.
Figure 6B:
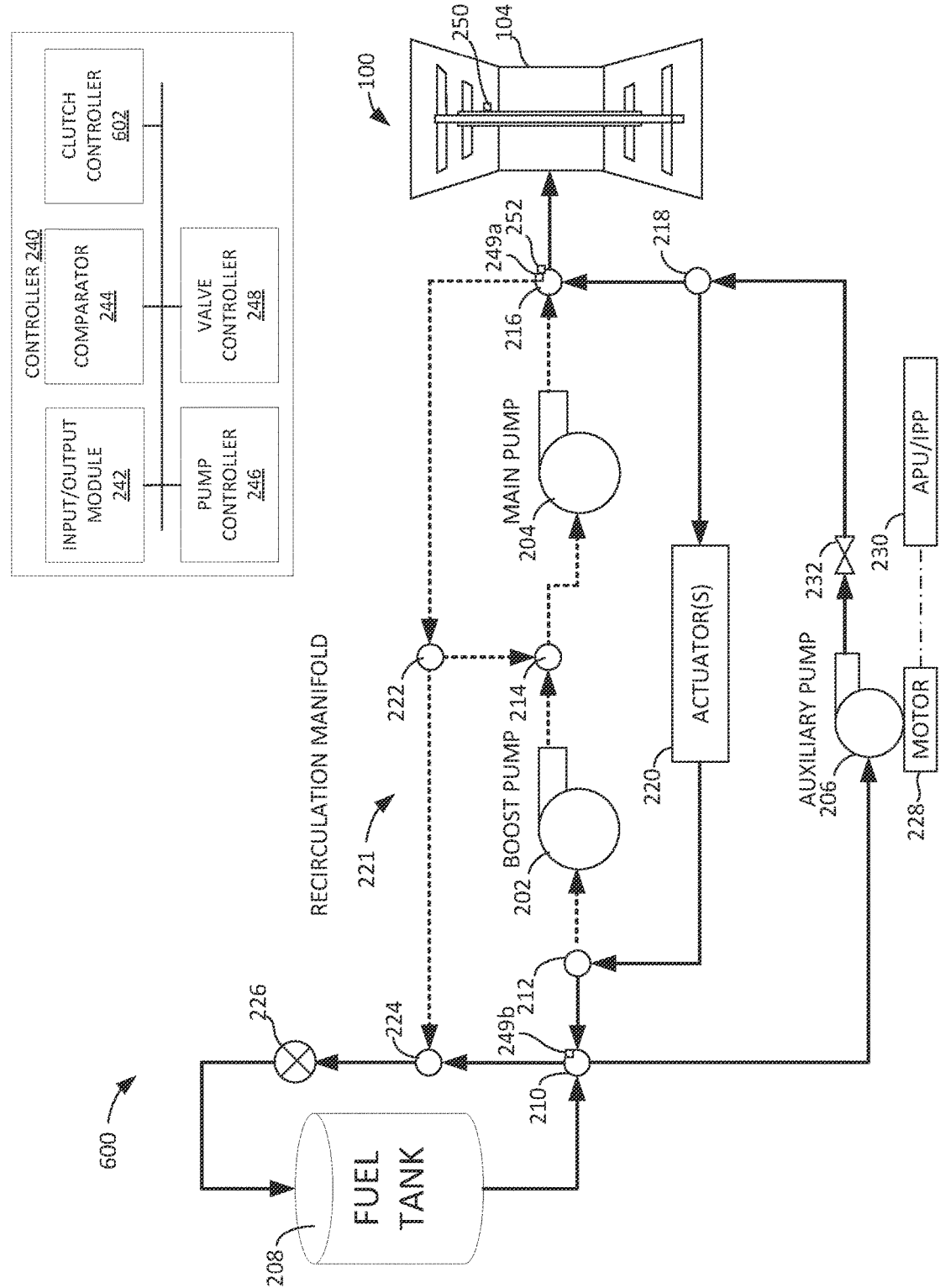
FIG. 6B shows the fourth example fuel system of FIG. 6A operating in a second mode in which an example auxiliary pump is used to supply pressurized fuel flow.

FIGS. 6A and 6B are schematic diagrams of fourth example fuel system 600 that can be implemented in connection with the gas turbine engine 104. Those components of the fourth fuel system 600 that are substantially similar or identical to the components of the first example fuel system 200, the second example fuel system 400, and/or the third example fuel system 500 disclosed above in connection with FIGS. 2A, 2B, 4A, 4B, 5A, and 5B and that have structure and/or functions substantially similar or identical to the structure and/or functions of those components will not be described in detail again below. Instead, the interested reader is referred to the above corresponding descriptions. To facilitate this process, the same reference numbers are used for like structures.

FIG. 6A shows the fourth example fuel system 600 operating in the first mode. In the first mode, the fourth fuel system 600 operates substantially the same as the first fuel system 200 in the first mode disclosed in connection with FIG. 2A. In the first, second, and third fuel systems 200, 400, 500 disclosed above, the boost pump 202 and the main pump 204 are hydraulically disconnected from the main fuel circuit for the gas turbine engine 104 and the actuator(s) 220.

In the fourth fuel system 600 of FIGS. 6A and 6B, the boost pump 202 and the main pump 204 are mechanically disconnected. For example, the boost pump 202 and the main pump 204 are coupled to the accessory gearbox 300 via the first and second clutches 306, 308, as shown in FIG. 3. In other words, the first clutch 306 is between the boost pump 202, and the accessory gearbox 300 and the second clutch 308 is between the main pump 204 and the accessory gearbox 300. The first and second clutches 306, 308 are controlled by a clutch controller 602 of the controller 240 as shown in FIGS. 6A and 6B. In the first mode in FIG. 6A, the clutches 306, 308 are engaged. As such, the boost pump 202 and the main pump 204 are driven by the gas turbine engine 104.

FIG. 6B shows the fourth example fuel system 600 operating in the second mode. In the second mode, the clutch controller 602 opens or disengages the clutches 306, 308, which disengages the boost pump 202 and the main pump 204 from the accessory gearbox 300. As such, the boost pump 202 and the main pump 204 are not driven by the accessory gearbox 300, and no fuel is pumped through the pumps 202, 204. Therefore, in this example, the boost pump 202 and the main pump 204 are mechanically disconnected. In the second mode, the pump controller 246 activates the auxiliary pump 206. As shown in FIG. 6B, the auxiliary pump 206 supplies fuel to the fifth node 218, which is then distributed to the gas turbine engine 104 and/or the actuator(s) 220. The controller 240 can operate substantially the same as disclosed in connection with the fuel systems 200, 400, and 500 to operate the devices to switch the fourth fuel system 600 between the first mode (FIG. 6A) and the second mode (FIG. 6B) based on one or more measured parameters (e.g., efficiency, temperature, speed, etc.).

In some examples, the clutches 306, 308 are active clutches that are controllable by the clutch controller 602. In other examples, the clutches 306, 308 can be implemented by passive clutches, such as sprag clutches or one-way clutches that automatically engage or disengage based on the relative speeds of the pumps 202, 204 and the accessory gearbox 300.

Figure 7:
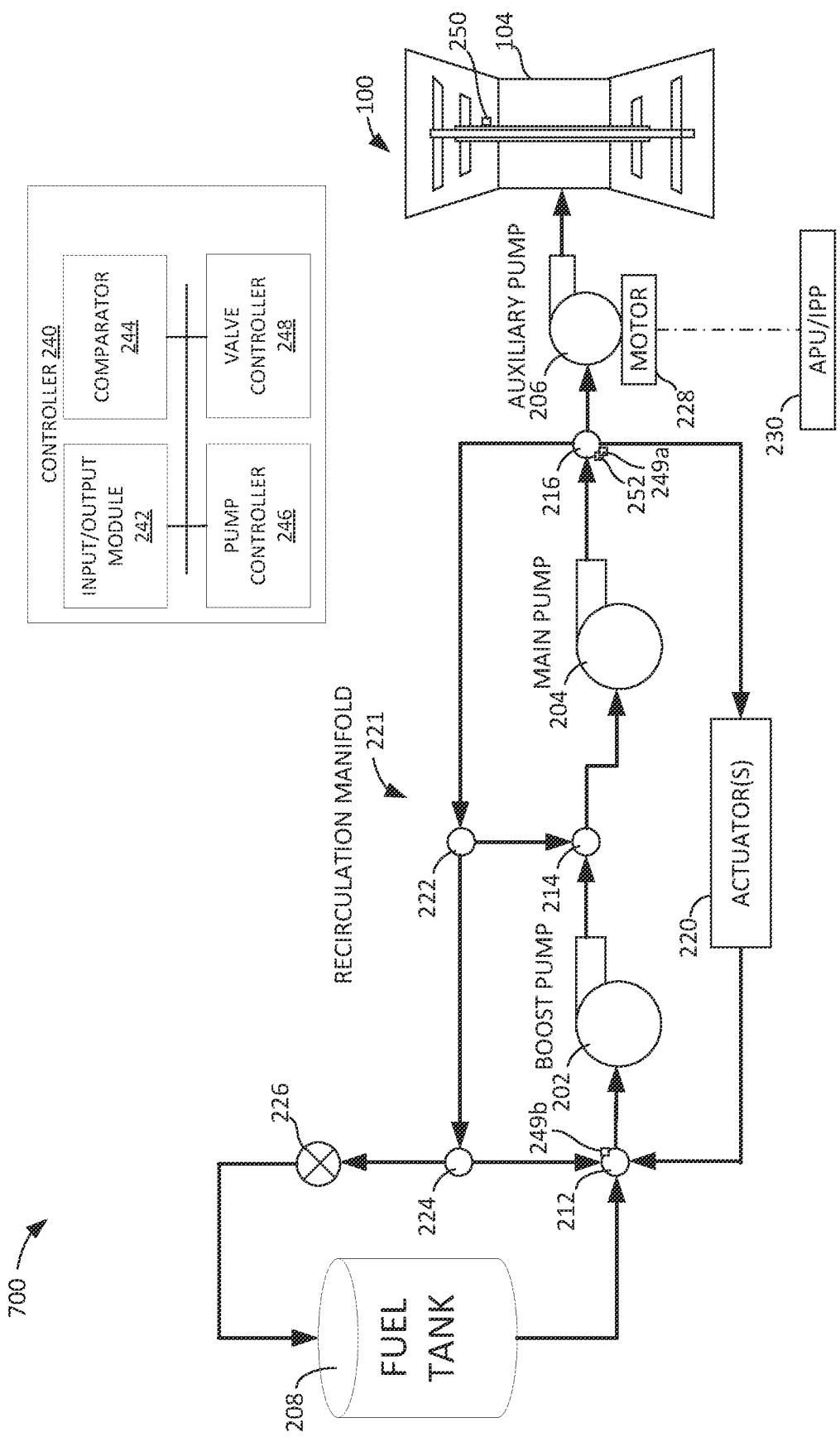
FIG. 7 is a schematic diagram of a fifth example fuel system that can be implemented on the example turbo engine.

FIG. 7 is a schematic diagram of a fifth example fuel system 700 that can be implemented in connection with the gas turbine engine 104. Those components of the fifth fuel system 700 that are substantially similar or identical to the components of the first example fuel system 200, the second example fuel system 400, the third example fuel system 500, and/or the fourth example fuel system 600 disclosed above in connection with FIGS. 2A, 2B, 4A, 4B, 5A, 5B, 6A, and 6B and that have structure and/or functions substantially similar or identical to the structure and/or functions of those components will not be described in detail again below. Instead, the interested reader is referred to the above corresponding descriptions. To facilitate this process, the same reference numbers are used for like structures.

In the example of FIG. 7, the auxiliary pump 206 is arranged and operates in series with the boost pump 202 and the main pump 204. In particular, in this example, the auxiliary pump 206 is between the fourth node 216 and the gas turbine engine 104. As such, the auxiliary pump 206 is downstream of the main pump 204. The auxiliary pump 206 increases the pressure of the fuel output by the main pump 204 to the final desired or set pressure before the gas turbine engine 104. In other words, the auxiliary pump 206 is sized to be make up the pressure difference between the pressure capability of the main pump 204 and the pressure requirement at the gas turbine engine 104 (e.g., the fuel nozzle flow-vs-dP requirement).

For example, the fuel at the fourth node 216 may be at a pressure of 1000 psi, and the auxiliary pump 206 may increase the pressure to 1500 psi to meet the pressure and flow demands of the gas turbine engine 104. In this example, the auxiliary pump 206 may be operated at all times, or most of the time, including during higher and lower speeds of the gas turbine engine 104. By arranging the pumps 202, 204, 206 in series, this enables the boost pump 202 and main pump 204 to be downsized and generate less pressure. This enables the boost pump 202 and the main pump 204 to operate more efficiently at lower speeds. This results in less waste heat added to the fuel by the pumps 202, 204. In some examples, the fifth fuel system 700 can be combined with the any of the example fuel systems 200, 400, 500, 600 where the gas turbine engine 104 is run at ground-idle if the primary system can be properly isolated/throttled.

Figure 8:
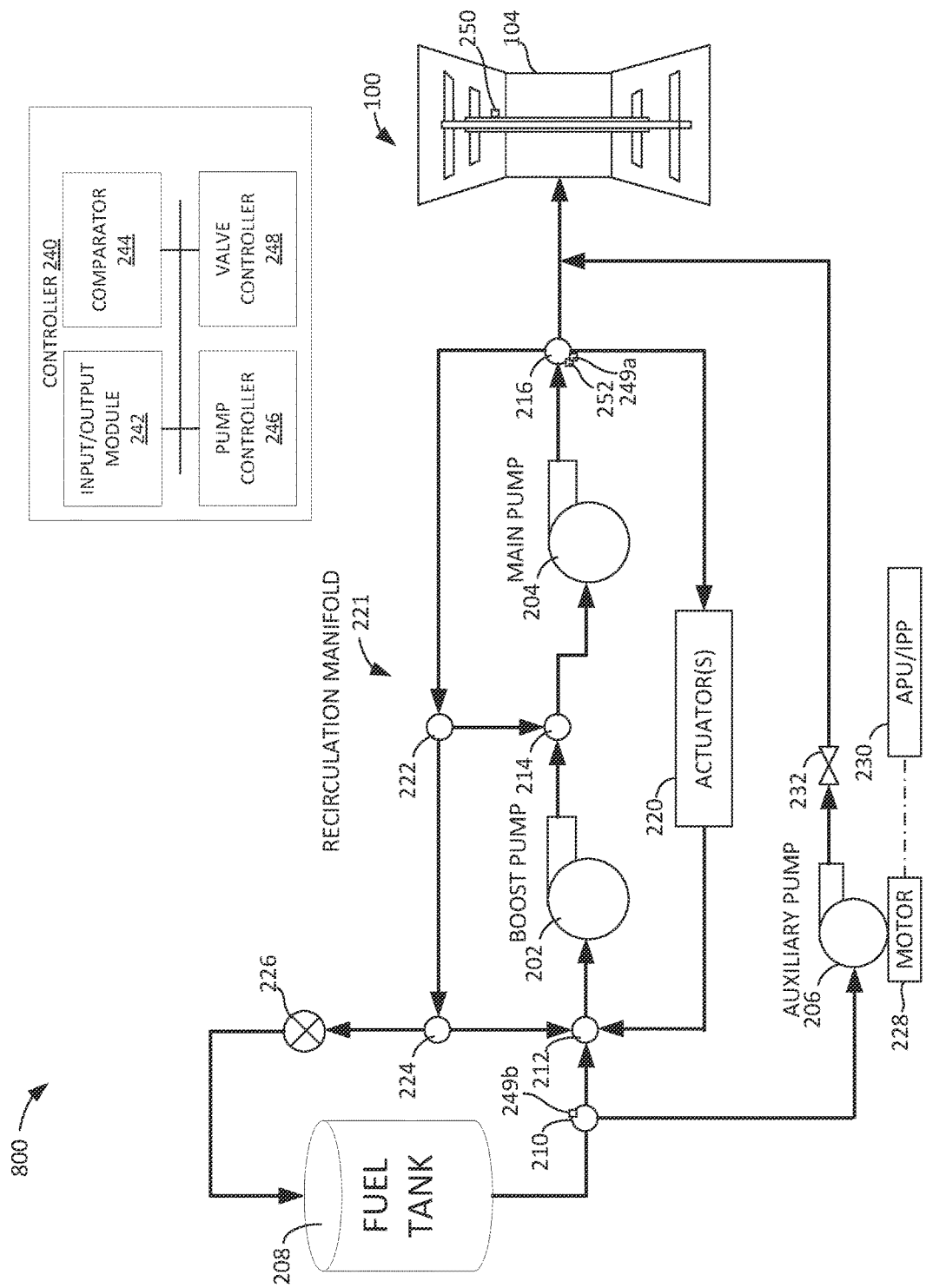
FIG. 8 is a schematic diagram of a sixth example fuel system that can be implemented on the example turbo engine.

FIG. 8 is a schematic diagram of a sixth example fuel system 800 that can be implemented in connection with the gas turbine engine 104. Those components of the sixth fuel system 800 that are substantially similar or identical to the components of the first example fuel system 200, the second example fuel system 400, the third example fuel system 500, the fourth example fuel system 600, and/or the fifth example fuel system 700 disclosed above in connection with FIGS. 2A, 2B, 4A, 4B, 5A, 5B, 6A, 6B, and 7 and that have structure and/or functions substantially similar or identical to the structure and/or functions of those components will not be described in detail again below. Instead, the interested reader is referred to the above corresponding descriptions. To facilitate this process, the same reference numbers are used for like structures.

In the example of FIG. 8, the auxiliary pump 206 is arranged and operates in parallel with the boost pump 202 and the main pump 204. The outlet of the auxiliary pump 206 is fluidly coupled to the gas turbine engine 104. In some examples, the auxiliary pump 206 may be operated at all times, or most of the time, including during higher and lower speeds of the gas turbine engine 104. In particular, in this example, the boost pump 202 and the main pump 204 are operated at all times, and the auxiliary pump 206 can be turned on and off as additional flow capacity is needed. For example, the controller 240 can monitor the flow rate of the fuel provided the gas turbine engine 104, and can turn the auxiliary pump 206 on and off as needed to meet a desired flow rate to the gas turbine engine 104. In some examples, the auxiliary pump 206 may be sized to be make up the pressure difference between the pressure capability of the main pump 204 and the maximum flow rate needed at the gas turbine engine 104. This enables the boost pump 202 and main pump 204 to be downsized to handle a maximum flow rate more consistent with cruise. This also enables the boost pump 202 and the main pump 204 to operate more efficiently at lower speeds. As a result, less waste heat is added to the fuel by the pumps 202, 204. In some examples, the auxiliary pump 206 can be fed with fuel from the third node 214 instead of the first node 210. This reduces the power required by the auxiliary pump 206, since the fuel is already partially pressurized.

In some examples, the sixth fuel system 800 can be combined with the any of the example fuel systems 200, 400, 500, 600 where the gas turbine engine 104 is run at ground-idle if the primary system can be properly isolated/throttled. In some examples, prime reliability not a concern because the parallel fuel path is for thermal management system (TMS) improvement, and gas turbine engine 104 can run off of main system only in event of electric pumping system failure.

While in some examples the auxiliary pump 206 of the fuel systems 200, 400, 500, 600, 700, and 800 is an electrically-powered pump, in other examples, the auxiliary pump 206 could be another type of pump, such as a pneumatically-powered pump or a mechanically-driven pump. For example, bleed air from the gas turbine engine 104 can be used to drive the auxiliary pump 206.

While an example manner of implementing the controller 240 is illustrated in FIGS. 2A, 2B, 4A, 4B, 5A, 5B, 6A, 6B, 7, and 8, one or more of the elements, processes, and/or devices illustrated in FIGS. 2A, 2B, 4A, 4B, 5A, 5B, 6A, 6B, 7, and 8 may be combined, divided, re-arranged, omitted, eliminated, and/or implemented in any other way. Further, the example input/output module 242, the example comparator 244, the example pump controller 246, the example valve controller 248, the example clutch controller 602, and/or, more generally, the example controller 240 of FIGS. 2A, 2B, 4A, 4B, 5A, 5B, 6A, 6B, 7, and 8, may be implemented by hardware alone or by hardware in combination with software and/or firmware. Thus, for example, any of the example input/output module 242, the example comparator 244, the example pump controller 246, the example valve controller 248, the example clutch controller 602, and/or, more generally, the example controller 240, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller 240 of FIGS. 2A, 2B, 4A, 4B, 5A, 5B, 6A, 6B, 7, and 8 may include one or more elements, processes, and/or devices in addition to, or instead of, those illustrated in FIGS. 2A, 2B, 4A, 4B, 5A, 5B, 6A, 6B, 7, and 8, and/or may include more than one of any or all of the illustrated elements, processes and devices.

Figure 9:
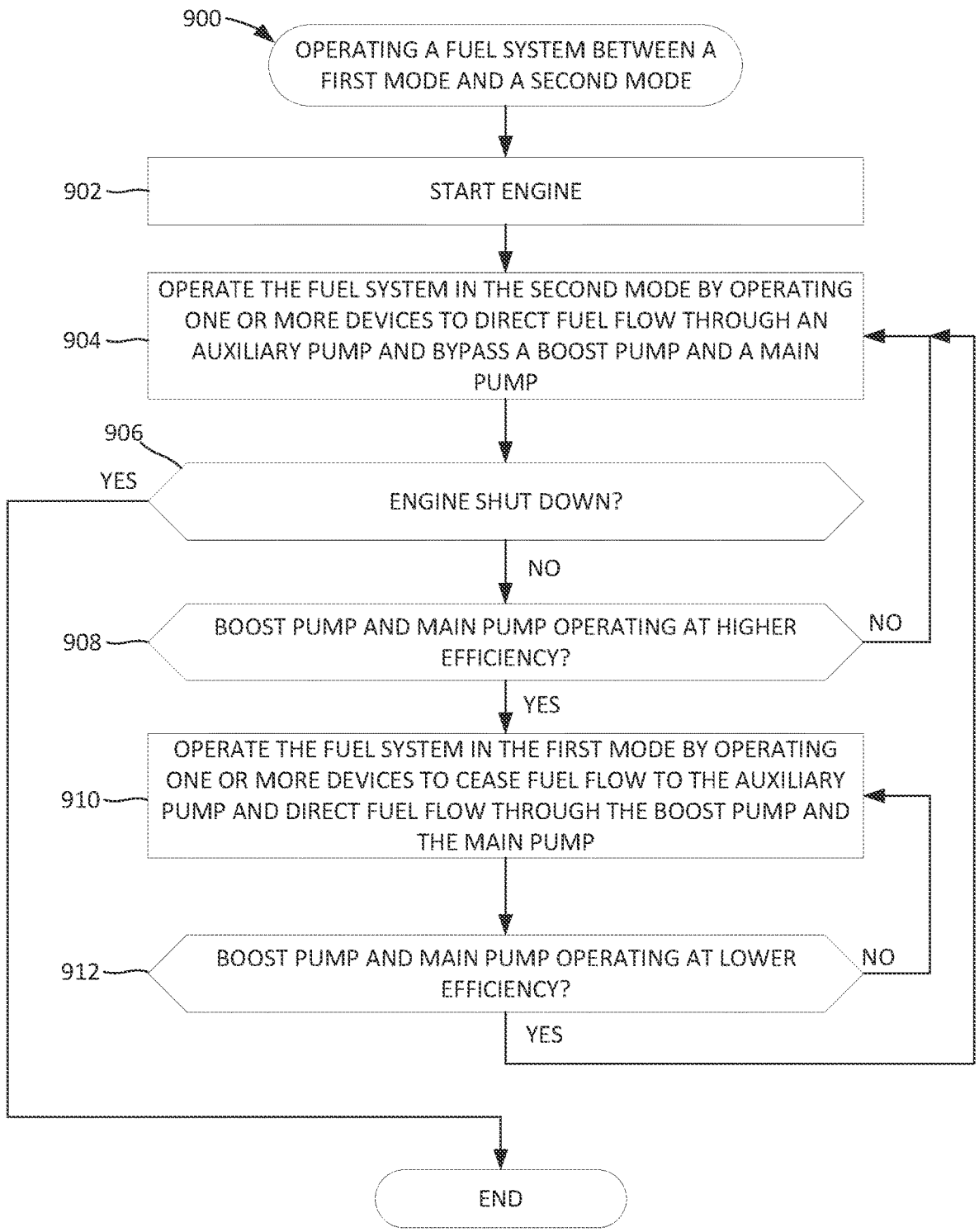
FIG. 9 is a flowchart representative of example machine readable instructions and/or example operations that may be executed, instantiated, and/or performed by example programmable circuitry to implement an example fuel system controller for operating an example fuel system between a first mode and a second mode.

A flowchart representative of example machine readable instructions, which may be executed by programmable circuitry to implement and/or instantiate the controller 240 of FIGS. 2A, 2B, 4A, 4B, 5A, 5B, 6A, 6B, 7, and 8, and/or representative of example operations which may be performed by programmable circuitry to implement and/or instantiate the controller 240 of FIGS. 2A, 2B, 4A, 4B, 5A, 5B, 6A, 6B, 7, and 8, is shown in FIG. 9. The machine readable instructions may be one or more executable programs or portion(s) of one or more executable programs for execution by programmable circuitry such as the programmable circuitry 1012 shown in the example processor platform 1000 discussed below in connection with FIG. 10 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk.

The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums.

Further, although the example program is described with reference to the flowchart(s) illustrated in FIG. 9, many other methods of implementing the example controller 240 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.).

The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information).

As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 9 is a flowchart representative of example machine readable instructions and/or example operations 900 that may be executed and/or instantiated by programmable circuitry for operating a fuel system in a first mode and a second mode. The example machine readable instructions and/or example operations 900 can be implemented in connection with any of the example fuel systems 200, 400, 500, 600, 700, 800 disclosed above.

At block 902, the gas turbine engine 104 of the turbo engine 100 is started. In some examples, the turbo engine 100 is started by a starter turbine that spins one or both of the shafts 126, 128. The starter turbine may receive hydraulic pressure from an APU or the other engine (assuming the other engine is started). As the shaft(s) 126, 128 is/are spinning, fuel is injected into the combustion section 118 and ignited. Thereafter the gas turbine engine 104 continues to run.

Typically, once the turbo engine 100 is started, the turbo engine 100 operates at lower speeds, such as idle. During these lower speeds, the boost pump 202 and the main pump 204 are less efficient and add waste heat to the fuel. Therefore, it is beneficial to operate the fuel system in the second mode to reduce or eliminate added waste heat. At block 904, the controller 240 operates the fuel system in the second mode by operating one or more devices to direct fuel flow through the auxiliary pump 206 and bypass the boost pump 202 and the main pump 204. The one or more devices can include the electric motor 228 for powering the auxiliary pump 206, one or more valve(s) (e.g., the valve 236, the flow valve 502), the clutches 306, 308, one or more pressure regulator(s), etc.

To operate the fuel system in the second mode, the pump controller 246 activates the auxiliary pump 206. The pump controller 246 may activate the auxiliary pump 206 by supplying power to the electric motor 228 from the APU/IPP 230 of the aircraft. Further, the pump controller 246 can increase or decrease the speed of the auxiliary pump 206 to achieve a desired output pressure, such as 800 PSI. In some examples, such as in the first and second fuel systems 200, 400, the valve controller 248 controls the valves 236, 402 to direct fuel through the eductor 234. In some examples, such as in the third fuel system 500, the valve controller 248 controls the flow valve 502 and the idler valve 504 as disclosed in connection with FIG. 5B. In some examples, such as in the fourth fuel system 600, the clutch controller 602 activates the first and second clutches 306, 308 to disconnect the boost pump 202 and the main pump 204 from the accessory gearbox 300. Therefore, in some examples, the boost pump 202 and the main pump 204 are hydraulically or mechanically disconnected while the fuel system is operating in the second mode.

At block 906, the controller 240 determines if the turbo engine 100 is shut down. Engine shut down may be initiated by a pilot, for example. This may occur after the aircraft lands and is docked at an airport terminal. If the turbo engine 100 is shut down, the example process of FIG. 9 ends.

If the turbo engine 100 is not shut down, at block 908, the controller 240 determines if the boost pump 202 and the main pump 204 are operating at a higher efficiency. As disclosed above, the efficiency of the boost pump 202 and the main pump 204 may be based on or defined by one or more parameters, such as the temperature or temperature difference of the fuel, the speed of the gas turbine engine 104, the pressure of the fuel output by the main pump 204, etc. The comparator 244 may compare the efficiency to an efficiency threshold (e.g., a temperature threshold, a speed threshold, etc.). If the efficiency is below the efficiency threshold (e.g., such as during lower speeds such as idle or cruise), control proceeds to block 904 where the controller 240 continues to operate the fuel system in the second mode.

If the efficiency is above the efficiency threshold (e.g., such as during higher speeds such as take-off and climb), control proceeds to block 910, and the fuel system is switched to the first mode. At block 910, the controller 240 operates the fuel system in the first mode by operating one or more devices to cease fuel flow to the auxiliary pump 206 and instead direct fuel flow through the boost pump 202 and the main pump 204. The one or more devices can include the electric motor 228 for powering the auxiliary pump 206, one or more valve(s) (e.g., the valve 236, the valve 402, etc.), the clutches 306, 308, one or more pressure regulator(s), etc. For example, during the first mode, the pump controller 246 turns off or deactivates the auxiliary pump 206, such as by cutting off power supply to the electric motor 228.

In some examples, such as in the first and second fuel systems 200, 400, the valve controller 248 controls (e.g., closes) the valves 236, 402 to stop directing fuel through the eductor 234. In some examples, such as in the third fuel system 500, the valve controller 248 controls (e.g., opens) the flow valve 502 and the idler valve 504 as disclosed in connection with FIG. 5A. In some examples, such as in the fourth fuel system 600, the clutch controller 602 causes the clutches 306, 308 to engage or connect the boost pump 202 and the main pump 204 to the accessory gearbox 300, such that the boost pump 202 and the main pump 204 are driven by the gas turbine engine 104.

At block 912, the controller 240 determines if the boost pump 202 and the main pump 204 are operating at a lower efficiency. For example, the comparator 244 may again compare the efficiency to the efficiency threshold. If the efficiency is still above the efficiency threshold, control proceeds to block 910 and the controller 240 continues to operate the fuel system in the first mode. However, if the efficiency is at or below above the efficiency threshold, control proceeds back to block 904 and the controller 240 operates the device(s) of the system to switch the fuel system back to the second mode.

In the fifth and sixth fuel systems 700, 800, the boost pump 202 and the main pump 204 are being driven at all times. In these examples, the controller 240 can activate the auxiliary pump 206 when additional flow is needed. For example, the controller 240 may monitor one or more parameters (e.g., efficiency, temperature, flow, etc.) and control the auxiliary pump 206 to ensure a certain flow is achieved.

Figure 10:
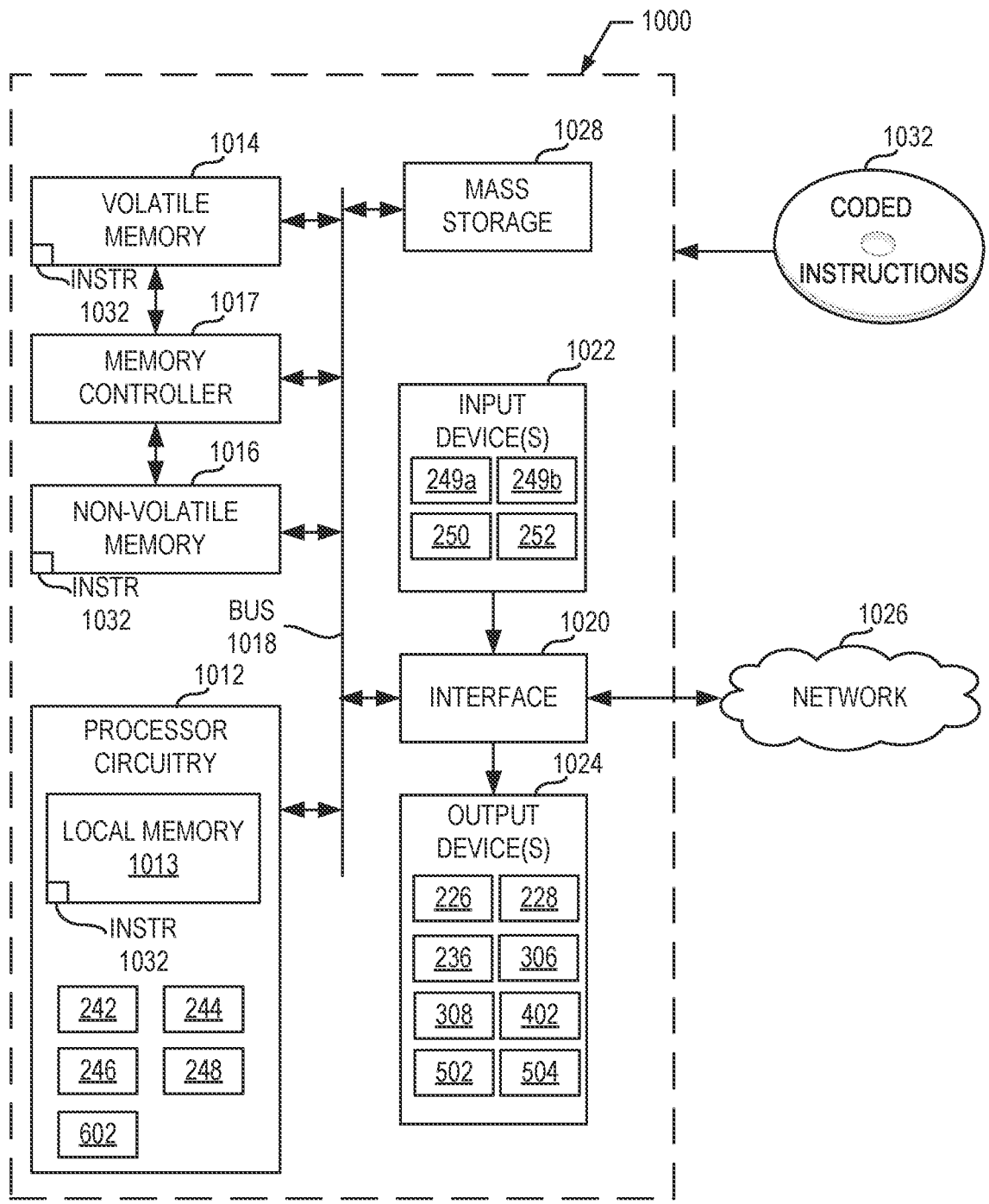
FIG. 10 is a block diagram of an example processing platform including programmable circuitry structured to execute, instantiate, and/or perform the example machine readable instructions and/or perform the example operations of FIG. 9 to implement the example fuel system controller.

FIG. 10 is a block diagram of an example programmable circuitry platform 1000 structured to execute and/or instantiate the example machine-readable instructions and/or the example operations of FIG. 9 to implement the controller 240 of FIGS. 2A, 2B, 4A, 4B, 5A, 5B, 6A, 6B, 7, and 8. The programmable circuitry platform 1000 can be, for example, an electronic engine controller (EEC), a full authority digital engine control (FADEC), a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the input/output module 242, the comparator 244, the pump controller 246, the valve controller 248, and the clutch controller 602 of the example controller 240.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by the sensors 249a, 249b, 250, 252. Additionally or alternatively, the input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 implement the valve 226, the electric motor 228, the valve 236, the first and second clutches 306, 308, the valve 402, the flow valve 502, and the idler valve 504. Additionally or alternatively, the output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIG. 9 may be stored in the mass storage device 1028, in the volatile memory 1014, in the non-volatile memory 1016, and/or on at least one non-transitory computer readable storage medium such as a CD or DVD which may be removable.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

It can be appreciated that example fuel systems have been disclosed herein that utilize electrically-driven pumps to reduce or eliminate the use of the mechanically-driven pumps during lower speeds (e.g., at ground idle or flight idle) of the engine when such mechanically-driven pumps are typically less efficient. This significantly reduces or limits the amount of waste heat that would otherwise be added to the fuel by the mechanically-driven pumps. Reducing or limiting the added heat reduces or eliminates the drawbacks of added heat described herein, such as fuel lacquering or coke formation.

Further examples and example combinations thereof are provided by the subject matter of the following clauses:

A turbo engine for an aircraft, the turbo engine comprising: a gas turbine engine having a combustion section; a fuel system to provide pressurized fuel to the combustion section, the fuel system including: a fuel tank; a boost pump and a main pump driven by an accessory gearbox that is powered by a shaft of the turbo engine, the boost pump and the main pump arranged in series; an auxiliary pump; and a controller to operate the fuel system in (1) a first mode in which the boost pump and the main pump produce pressurized fuel for the turbo engine and the auxiliary pump is deactivated, and (2) a second mode in which the auxiliary pump is activated and produces the pressurized fuel for the turbo engine while bypassing the boost pump and the main pump.

The turbo engine of any preceding clause, wherein the auxiliary pump is driven by an electric motor.

The turbo engine of any preceding clause, wherein the electric motor is powered by an auxiliary power unit (APU) or an integrated power pack (IPP) of the aircraft.

The turbo engine of any proceeding clause, wherein the auxiliary pump is powered by a gearbox with a clutch.

The turbo engine of any preceding clause, wherein the controller is configured to operate the fuel system in the second mode when the boost pump and the main pump are operating at a lower efficiency, and the controller is configured to operate the fuel system in the first mode when the boost pump and the main pump are operating at a higher efficiency.

The turbo engine of any preceding clause, further including first and second temperature sensors to measure a temperature change of fuel across the boost pump and the main pump.

The turbo engine of any preceding clause, wherein the controller is configured to compare the temperature change to a threshold.

The turbo engine of any preceding clause, wherein the controller is configured to operate the fuel system in the first mode when the temperature difference is below the temperature threshold, and the controller is configured to operate the fuel system in the second mode when the temperature difference exceeds the temperature threshold.

The turbo engine of any preceding clause, further including a sensor to measure a speed of the gas turbine engine, wherein the controller is configured to compare the speed to a speed threshold.

The turbo engine of any preceding clause, wherein the controller is configured to operate the fuel system in the first mode when the speed is above the speed threshold, and the controller is configured to operate the fuel system in the second mode when the speed is below the speed threshold.

The turbo engine of any preceding clause, wherein the auxiliary pump is arranged in parallel with the boost pump and the main pump.

The turbo engine of any preceding clause, wherein the fuel system includes an eductor fluidly coupled to the boost pump and the main pump, wherein at least a portion of the pressurized fuel produced by the auxiliary pump in the second mode is routed through the eductor to cause the eductor to evacuate the boost pump and the main pump.

The turbo engine of any preceding clause, wherein the eductor is part of a recirculation manifold.

The turbo engine of any preceding clause, wherein the fuel system includes: a flow valve between the boost pump and the main pump; and an idler valve downstream of the main pump.

The turbo engine of any preceding clause, wherein, during the second mode, the controller is configured to (1) partially close the flow valve and (2) control the idler valve to direct fuel back to an inlet of the main pump.

The turbo engine of any preceding clause, further including: a first clutch between the boost pump and the accessory gearbox; and a second clutch between the main pump and the accessory gearbox, wherein, during the second mode, the controller is configured to cause the first and second clutches to disengage the boost pump and the main pump from the accessory gearbox.

The turbo engine of any preceding clause, wherein at least a portion of the pressurized fuel produced by the auxiliary pump in the second mode is routed to one or more actuators to provide hydraulic pressure to operate the one or more actuators.

A turbo engine for an aircraft, the turbo engine comprising: a gas turbine engine having a combustion section; and a fuel system to provide pressurized fuel to the combustion section, the fuel system including: a fuel tank; a boost pump and a main pump arranged in series between the fuel tank and the gas turbine engine; an auxiliary pump arranged in parallel with the boost pump and the main pump between the fuel tank and the gas turbine engine, the fuel system is operable between (1) a first mode in which the auxiliary pump is deactivated, and (2) a second mode in which the auxiliary pump is activated; and a controller to operate the fuel system in the second mode when the boost pump and the main pump are operating at a lower efficiency and operate the fuel system in the first mode when the boost pump and the main pump are operating at a higher efficiency.

The turbo engine of any preceding clause, wherein the auxiliary pump is driven by an electric motor.

The turbo engine of any preceding clause, wherein the electric motor is powered by an auxiliary power unit (APU) or an integrated power pack (IPP) of the aircraft.

The turbo engine of any preceding clause, further including an accessory gearbox powered by the gas turbine engine, the boost pump and the main pump driven by the accessory gearbox, the turbo engine further including a first clutch between the boost pump and the accessory gearbox and a second clutch between the main pump and the accessory gearbox.

The turbo engine of any preceding clause, wherein, during the second mode, the controller is to activate the clutches to disconnect the boost pump and the main pump from the accessory gearbox.

A non-transitory machine readable storage medium comprising instructions that, when executed, cause programmable circuitry to: operate a fuel system of a turbo engine of an aircraft in a first mode, the fuel system including a boost pump and a main pump arranged in series and an auxiliary pump arranged in parallel with the boost pump and the main pump, wherein, in the first mode, fuel is directed through the boost pump and the main pump while the auxiliary pump is deactivated; determine the boost pump and the main pump are operating at a lower efficiency; and in response to determining the boost pump and the main pump are operating at a lower efficiency, operate the fuel system in a second mode by activating the auxiliary pump.

The non-transitory machine readable storage medium of any preceding clause, wherein the lower efficiency corresponds to idle and cruise speeds of the turbo engine.

The non-transitory machine readable storage medium of any preceding clause, wherein the fuel system includes an electric motor to power the auxiliary pump, and the instructions, when executed, cause the programmable circuitry to activate the auxiliary pump during the second mode by supplying power to the electric motor from an auxiliary power unit (APU) or an integrated power pack (IPP) of the aircraft.

A fuel system for a turbo engine of an aircraft, the fuel system comprising: a fuel tank; a boost pump and a main pump driven by an accessory gearbox that is powered by a shaft of the turbo engine, the boost pump and the main pump arranged in series; an auxiliary pump arranged in series with the boost pump and main pump, the auxiliary pump downstream of the main pump; and a controller to operate the auxiliary pump to increase a pressure of fuel output by the main pump.

The fuel system of any preceding clause, wherein the auxiliary pump is driven by an electric motor.

The fuel system of any preceding clause, wherein the electric motor is powered by an auxiliary power unit (APU) or an integrated power pack (IPP) of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A turbo engine for an aircraft, the turbo engine comprising:
   a gas turbine engine having a combustion section; and
   a fuel system to provide pressurized fuel to the combustion section, the fuel system including:
      a fuel tank;
      a boost pump and a main pump driven by an accessory gearbox that is powered by a shaft of the turbo engine, the boost pump and the main pump arranged in series;
      first and second temperature sensors to measure a temperature difference fuel across the boost pump and the main pump;
      an auxiliary pump; and
      a controller configured to:
         compare the temperature difference to a threshold; and
         operate the fuel system in (1) a first mode in which the boost pump and the main pump produce pressurized fuel for the turbo engine and the auxiliary pump is deactivated when the temperature difference is below the threshold, and (2) a second mode in which the auxiliary pump is activated and produces the pressurized fuel for the turbo engine while bypassing the boost pump and the main pump when the temperature difference exceeds the threshold.

2. The turbo engine of claim 1, wherein the auxiliary pump is driven by an electric motor.

3. The turbo engine of claim 2, wherein the electric motor is powered by an auxiliary power unit (APU) or an integrated power pack (IPP) of the aircraft.

4. The turbo engine of claim 1, wherein the auxiliary pump is powered by a gearbox with a clutch.

5. The turbo engine of claim 1, wherein the auxiliary pump is arranged in parallel with the boost pump and the main pump.

6. The turbo engine of claim 1, wherein the fuel system includes an eductor fluidly coupled to the boost pump and the main pump, wherein at least a portion of the pressurized fuel produced by the auxiliary pump in the second mode is routed through the eductor to cause the eductor to evacuate the boost pump and the main pump.

7. The turbo engine of claim 6, wherein the eductor is part of a recirculation manifold.

8. The turbo engine of claim 1, wherein the fuel system includes:
   a flow valve between the boost pump and the main pump; and
   an idler valve downstream of the main pump.

9. The turbo engine of claim 1, wherein at least a portion of the pressurized fuel produced by the auxiliary pump in the second mode is routed to one or more actuators to provide hydraulic pressure to operate the one or more actuators.

10. A turbo engine for an aircraft, the turbo engine comprising:
   a gas turbine engine having a combustion section; and
   a fuel system to provide pressurized fuel to the combustion section, the fuel system including:
      a fuel tank;
      a boost pump and a main pump driven by an accessory gearbox that is powered by a shaft of the turbo engine, the boost pump and the main pump arranged in series;
      a flow valve between the boost pump and the main pump; and
      an idler valve downstream of the main pump;
      an auxiliary pump; and
      a controller configured to operate the fuel system in (1) a first mode in which the boost pump and the main pump produce pressurized fuel for the turbo engine and the auxiliary pump is deactivated, and (2) a second mode in which the auxiliary pump is activated and produces the pressurized fuel for the turbo engine while bypassing the boost pump and the main pump, wherein, during the second mode, the controller is configured to (1) partially close the flow valve and (2) control the idler valve to direct fuel back to an inlet of the main pump.

11. The turbo engine of claim 10, further including first and second temperature sensors to measure a temperature change of fuel across the boost pump and the main pump.

12. The turbo engine of claim 11, wherein the controller is configured to:
   compare the temperature change to a threshold;
   operate the fuel system in the first mode when the temperature change is below the threshold; and
   operate the fuel system in the second mode when the temperature change exceeds the threshold.

13. The turbo engine of claim 10, wherein the controller is configured to operate the fuel system in the second mode when the boost pump and the main pump are operating at a lower efficiency, and the controller is configured to operate the fuel system in the first mode when the boost pump and the main pump are operating at a higher efficiency.

14. The turbo engine of claim 10, further including a sensor to measure a speed of the gas turbine engine, wherein the controller is configured to compare the speed to a speed threshold.

15. The turbo engine of claim 14, wherein the controller is configured to operate the fuel system in the first mode when the speed is above the speed threshold, and the controller is configured to operate the fuel system in the second mode when the speed is below the speed threshold.

16. A turbo engine for an aircraft, the turbo engine comprising:
   a gas turbine engine having a combustion section; and
   a fuel system to provide pressurized fuel to the combustion section, the fuel system including:
      a fuel tank;
      a boost pump and a main pump driven by an accessory gearbox that is powered by a shaft of the turbo engine, the boost pump and the main pump arranged in series;
      an auxiliary pump;
      a controller configured to operate the fuel system in (1) a first mode in which the boost pump and the main pump produce pressurized fuel for the turbo engine and the auxiliary pump is deactivated, and (2) a second mode in which the auxiliary pump is activated and produces the pressurized fuel for the turbo engine while bypassing the boost pump and the main pump;
      a first clutch between the boost pump and the accessory gearbox; and
      a second clutch between the main pump and the accessory gearbox, wherein, during the second mode, the controller is configured to cause the first and second clutches to disengage the boost pump and the main pump from the accessory gearbox.

17. The turbo engine of claim 16, further including first and second temperature sensors to measure a temperature change of fuel across the boost pump and the main pump.

18. The turbo engine of claim 17, wherein the controller is configured to:
   compare the temperature change to a threshold;
   operate the fuel system in the first mode when the temperature change is below the threshold; and
   operate the fuel system in the second mode when the temperature change exceeds the threshold.

19. A non-transitory machine readable storage medium comprising instructions that, when executed, cause programmable circuitry to:
   compare a temperature difference to a threshold, the temperature difference measured across a boost pump and a main pump of a fuel system of a turbo engine of an aircraft, the boost pump and the main pump arranged in series, the fuel system including an auxiliary pump arranged in parallel with the boost pump and the main pump;
   operate the fuel system in a first mode when the temperature difference is below the threshold, wherein, in the first mode, fuel is directed through the boost pump and the main pump while the auxiliary pump is deactivated;
   determine the temperature difference exceeds the threshold; and in response to determining the temperature difference exceeds the threshold, operate the fuel system in a second mode by activating the auxiliary pump.

20. The non-transitory machine readable storage medium of claim 19, wherein the fuel system includes an electric motor to power the auxiliary pump, and the instructions, when executed, cause the programmable circuitry to activate the auxiliary pump during the second mode by supplying power to the electric motor from an auxiliary power unit (APU) or an integrated power pack (IPP) of the aircraft.

* * * * *